United States Patent
Tokura

(10) Patent No.: US 8,091,493 B2
(45) Date of Patent: Jan. 10, 2012

(54) SEWING MACHINE, AND COMPUTER-READABLE STORAGE MEDIUM STORING SEWING MACHINE CONTROL PROGRAM

(75) Inventor: Masashi Tokura, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 568 days.

(21) Appl. No.: 12/320,337

(22) Filed: Jan. 23, 2009

(65) Prior Publication Data

US 2009/0188415 A1 Jul. 30, 2009

(30) Foreign Application Priority Data

Jan. 24, 2008 (JP) .................. 2008-013418

(51) Int. Cl.
*D05B 19/00* (2006.01)
(52) U.S. Cl. .................. 112/470.01; 700/136
(58) Field of Classification Search .......... 700/136–138; 112/470.01, 470.06, 475.19, 470.04
See application file for complete search history.

(56) References Cited

U.S. PATENT DOCUMENTS

| | | | |
|---|---|---|---|
| 6,263,815 B1 * | 7/2001 | Furudate | 112/470.13 |
| 6,871,606 B2 * | 3/2005 | Schweizer | 112/102.5 |
| 6,994,042 B2 * | 2/2006 | Schweizer | 112/470.03 |
| 7,155,302 B2 * | 12/2006 | Muto et al. | 700/138 |

FOREIGN PATENT DOCUMENTS

| | | |
|---|---|---|
| JP | A-61-277012 | 12/1986 |
| JP | A-63-061903 | 3/1988 |
| JP | A-64-002889 | 1/1989 |
| JP | A-04-181106 | 6/1992 |
| JP | A-04-364884 | 12/1992 |
| JP | A-04-364885 | 12/1992 |
| JP | A-07-265569 | 10/1995 |
| JP | A-10-040499 | 2/1998 |
| JP | B2-3138080 | 2/2001 |
| JP | B2-3550185 | 8/2004 |
| JP | B2-3600378 | 12/2004 |
| JP | B2-3753445 | 3/2006 |

* cited by examiner

*Primary Examiner* — Nathan Durham
(74) *Attorney, Agent, or Firm* — Oliff & Berridge, PLC

(57) ABSTRACT

A sewing machine includes an image pickup device that picks up over a sewing machine bed; a feature point coordinates calculation device that extracts feature points from the picked up image and calculates two-dimensional coordinates of the feature points; a reference coordinates storage device that stores three-dimensional reference coordinates of the feature points; a correlation device that correlates the reference coordinates with the feature point coordinates; a parameter calculation device that calculates a parameter about the image pickup device; a parameter storage device that stores the calculated parameter; a comparison image acquisition device that acquires the picked up image as a comparison image; a first determination device that determines whether comparison information matches with parameter information; and a first notification device that notifies that it is necessary to re-calculate the parameter depending on the result by the first determination device.

20 Claims, 19 Drawing Sheets

| TWO-DIMENSIONAL FEATURE POINT COORDINATES STORAGE AREA | | |
|---|---|---|
| FEATURE POINT NO. | TWO-DIMENSIONAL IMAGE COORDINATES | |
| | x | y |
| 0 | 317 | 229 |
| 1 | 294 | 229 |
| 2 | 283 | 229 |
| 3 | 260 | 229 |
| 4 | 248 | 228 |
| 5 | 225 | 228 |
| 6 | 213 | 228 |
| 7 | 192 | 227 |
| 8 | 280 | 343 |
| 9 | 255 | 343 |
| 10 | 243 | 343 |
| 11 | 220 | 343 |
| 12 | 279 | 373 |
| 13 | 254 | 373 |
| 14 | 242 | 373 |
| 15 | 218 | 373 |
| 16 | 312 | 436 |
| 17 | 289 | 436 |
| 18 | 276 | 436 |
| 19 | 252 | 436 |
| 20 | 238 | 436 |
| 21 | 214 | 435 |
| 22 | 201 | 435 |
| 23 | 177 | 435 |
| 24 | 71 | 122 |
| 25 | 37 | 453 |
| 26 | 601 | 130 |
| 27 | 624 | 453 |

| THREE-DIMENSIONAL FEATURE POINT COORDINATES STORAGE AREA |||||
|---|---|---|---|---|
| FEATURE POINT NO. | THREE-DIMENSIONAL IMAGE COORDINATES (IN WORLD COORDINATE SYSTEM) |||
| | X | Y | Z |
| 0 | 0 | 0 | 0 |
| 1 | -3.1 | 0 | 0 |
| 2 | -4.7 | 0 | 0 |
| 3 | -8 | 0 | 0 |
| 4 | -9.5 | 0 | 0 |
| 5 | -12.8 | 0 | 0 |
| 6 | -14.4 | 0 | 0 |
| 7 | -17.5 | 0 | 0 |
| 8 | -4.7 | -16 | 0 |
| 9 | -8 | -16 | 0 |
| 10 | -9.5 | -16 | 0 |
| 11 | -12.8 | -16 | 0 |
| 12 | -4.7 | -20 | 0 |
| 13 | -8 | -20 | 0 |
| 14 | -9.5 | -20 | 0 |
| 15 | -12.8 | -20 | 0 |
| 16 | 0 | -28 | 0 |
| 17 | -3.1 | -28 | 0 |
| 18 | -4.7 | -28 | 0 |
| 19 | -8 | -28 | 0 |
| 20 | -9.5 | -28 | 0 |
| 21 | -12.8 | -28 | 0 |
| 22 | -14.4 | -28 | 0 |
| 23 | -17.5 | -28 | 0 |
| 24 | -35.75 | 15.9 | 0 |
| 25 | -35.75 | -30.7 | 0 |
| 26 | 41.25 | 15.9 | 0 |
| 27 | 41.25 | -29.6 | 0 |

| THREE-DIMENSIONAL FEATURE POINT COORDINATES STORAGE AREA ||||||
|---|---|---|---|---|---|
| EMBROIDERY FRAME POSITION NO. | EMBROIDERY FRAME POSITION || THREE-DIMENSIONAL COORDINATES (IN WORLD COORDINATE SYSTEM) |||
| | X | Y | X | Y | Z |
| 1 | 0 | 0 | 0 | 0 | 0 |
| 2 | -5 | 0 | -5 | 0 | 0 |
| 3 | 0 | -5 | 0 | -5 | 0 |
| ⋮ | ⋮ | ⋮ | ⋮ | ⋮ | ⋮ |

SEWING MACHINE, AND COMPUTER-READABLE STORAGE MEDIUM STORING SEWING MACHINE CONTROL PROGRAM

CROSS-REFERENCE TO RELATED APPLICATION

This Application claims priority from JP 2008-013418, filed on Jan. 24, 2008, the content of which is hereby incorporated herein by reference in its entirety.

BACKGROUND

The present disclosure relates to a sewing machine and a computer-readable storage medium storing a program that controls the sewing machine and, more particularly, to a sewing machine equipped with an image pickup device and a computer-readable storage medium storing a control program that controls the sewing machine.

Conventionally, for a variety of purposes, a sewing machine has been proposed which is equipped with an image pickup device. For example, in an embroidery data modification apparatus described in Japanese Patent Application Laid-Open Publication No. HEI 4-364884, an electronic camera is equipped on a sewing machine that performs sewing based on embroidery data. An image photographed with the electronic camera is utilized to modify the location of a needle drop point for a stitch in accordance with actual sewing results. Generally, in the case of acquiring and utilizing the location (coordinates) of a photography subject by an image photographed with a camera as in the case of measurement by use of an air photo, the camera will be calibrated in order to grasp a precise location of the photography subject based on the image. Camera calibration involves the calculation of an internal parameter which is determined by a configuration of the camera such as a focal distance or a principal point coordinate and an external parameter which is determined by a condition in which the camera is set up such as its photographing direction. With the parameters calculated through camera calibration, it is possible to know a location in a two-dimensional coordinate system (photographed image) at which a point (real photography subject) in a three-dimensional coordinate system should be projected. Therefore, if a point in the photographed image is projected precisely with the parameters, a precise location (coordinates) of that point becomes clear. Thus, by carrying out camera calibration, it is possible to correct strain in picked-up images which is caused by properties of the camera itself or a condition in which the camera is set up. How to perform camera calibration (calculate the parameters) has been studied variously, resulting in the proposal of, for example, an automatic calibration apparatus for a visual sensor described in Japanese Patent Application Laid-Open Publication No. 3138080.

SUMMARY

If an image picked up with an electronic camera is used as it is as in the case of an embroidery data modification apparatus described in Japanese Patent Application Laid-Open Publication No. HEI 4-364884, there is such a problem that a shift could highly occur in coordinates acquired from the image. To solve this problem, there is a need to correct also an image picked up with the electronic camera mounted on a sewing machine with the parameters calculated by calibration. However, the electronic camera mounted on the sewing machine may possibly shift in location thereon even slightly due to vibrations of the body of the sewing machine. There is also such a possibility that the mounting location of the electronic camera may shift because a user has touched it by mistake. This leads to a problem that parameters calculated at the time of shipment of the sewing machine may not always be appropriate for an image actually picked up. Therefore, in the case of modifying or processing sewing data by an image picked up with the electronic camera, the picked-up image may not precisely be corrected due to that problem, thus bringing about a problem that the results of sewing may not be beautiful.

To solve these problems, the present disclosure has been developed, and it is an object of the present disclosure to provide a sewing machine that is equipped with an image pickup device and that can acquire the information of a precise location of a photography subject from an image picked up with this image pickup device even if a condition in which this image pickup device is set up changes, and a computer-readable storage medium storing a program that controls this sewing machine.

To solve these problems above, the first aspect of the present disclosure provides a sewing machine comprising, an image pickup device that is disposed at a position where an image can be picked up over a sewing machine bed; a feature point coordinates calculation device that extracts a plurality of feature points arranged over a range such that the image pickup device can pick up images therein from the image picked up by the image pickup device and calculates two-dimensional coordinates of the extracted feature points as feature point coordinates; a reference coordinates storage device that stores reference coordinates, which are previously measured three-dimensional coordinates of the feature points; a correlation device that correlates the reference coordinates stored in the reference coordinates storage device with the feature point coordinates calculated by the feature point coordinates calculation device; a parameter calculation device that calculates a parameter about the image pickup device based on a result of correlation by the correlation device; a parameter storage device that stores the parameter calculated by the parameter calculation device; a comparison image acquisition device that acquires the image picked up by the image pickup device as a comparison image; a first determination device that determines whether comparison information which is based on the comparison image acquired by the comparison image acquisition device matches with parameter information which is based on a basic image which was used to calculate the parameter stored in the parameter storage device; and a first notification device that notifies that it is necessary to re-calculate the parameter if the first determination device has determined that the comparison information and the parameter information do not match with each other, wherein the comparison information and the parameter information which are determined by the first determination device as to whether they match with each other are respectively at least one of: the comparison image and the basic image; the feature point coordinates calculated based on the comparison image and the feature point coordinates calculated based on the basic image; and the parameter calculated based on the comparison image and the parameter stored in the parameter storage device.

The second aspect of the present disclosure provides a sewing machine comprising, an image pickup device that is disposed at a position where an image can be picked up over a sewing machine bed; a feature point coordinates calculation device that extracts a plurality of feature points arranged in such a range that the image pickup device can pick up images therein from the image picked up by the image pickup device and calculates two-dimensional coordinates of the extracted feature points as feature point coordinates; a reference coordinates storage device that stores reference coordinates, which are previously measured three-dimensional coordinates of the feature points; a correlation device that correlates the reference coordinates stored in the reference coordinates storage device with the feature point coordinates calculated by the feature point coordinates calculation device; a parameter calculation device that calculates a parameter about the image pickup device based on a result of correlation by the correlation device; a parameter storage device that stores the parameter calculated by the parameter calculation device; a comparison image acquisition device that acquires the image picked up by the image pickup device as a comparison image; a first determination device that determines whether comparison information which is based on the comparison image acquired by the comparison image acquisition device matches with parameter information which is based on a basic image which was used to calculate the parameter stored in the parameter storage device; a parameter re-calculation device that calculates the feature point coordinates with respect to the comparison image by the feature point coordinates calculation device, correlates the feature point coordinates calculated by the correlation device with the reference coordinates, and calculates the parameter based on a result of correlation by the parameter calculation device; and a first parameter correction device that stores the parameter calculated by the parameter re-calculation device into the parameter storage device if the first determination device has determined that the comparison information and the parameter information do not match with each other, wherein the comparison information and the parameter information which are determined by the first determination device as to whether they match with each other are respectively at least one of: the comparison image and the basic image; the feature point coordinates calculated based on the comparison image and the feature point coordinates calculated based on the basic image; and the parameter calculated based on the comparison image and the parameter stored in the parameter storage device.

The third aspect of the present disclosure provides a sewing machine comprising, an embroidery apparatus that moves an embroidery frame which holds work cloth; an image pickup device that is disposed at a position where an image can be picked up over a sewing machine bed; a feature point coordinates calculation device that extracts a plurality of feature points arranged in such a range that the image pickup device can pick up images therein from the image picked up by the image pickup device and calculates two-dimensional coordinates of the extracted feature points as feature point coordinates; a reference coordinates storage device that stores reference coordinates, which are previously measured three-dimensional coordinates of the feature points; a correlation device that correlates the reference coordinates stored in the reference coordinates storage device with the feature point coordinates calculated by the feature point coordinates calculation device; a parameter calculation device that calculates a parameter about the image pickup device based on a result of correlation by the correlation device; a parameter storage device that stores the parameter calculated by the parameter calculation device; an embroidery data acquisition device that acquires embroidery data which indicates at least coordinates of a stitch in order to sew a piece of embroidery; a schedule information calculation device that calculates schedule information about predetermined movement at the time when the embroidery frame is moved, based on the embroidery data acquired by the embroidery data acquisition device; a movement information acquisition device that picks up the image of the embroidery frame disposed on the sewing machine bed by the image pickup device before and after the predetermined movement on which the schedule information has been calculated by the schedule information calculation device when the embroidery frame was moved based on the embroidery data acquired by the embroidery data acquisition device, and acquires movement information about movement of at least one of the embroidery frame, the work cloth, and the stitch formed in the work cloth from the picked up image; a second determination device that determines whether the movement information acquired by the movement information acquisition device matches with the schedule information calculated by the schedule information calculation device; and a second notification device that notifies that it is necessary to re-calculate the parameter if the second determination device has determined that the movement information and the schedule information do not match with each other.

The fourth aspect of the present disclosure provides a sewing machine comprising, an embroidery apparatus that moves an embroidery frame which holds work cloth; an image pickup device that is disposed at a position where an image can be picked up over a sewing machine bed; a feature point coordinates calculation device that extracts a plurality of feature points arranged in such a range that the image pickup device can pick up images therein from the image picked up by the image pickup device and calculates two-dimensional coordinates of the extracted feature points as feature point coordinates; a reference coordinates storage device that stores reference coordinates, which are previously measured three-dimensional coordinates of the feature points; a correlation device that correlates the reference coordinates stored in the reference coordinates storage device with the feature point coordinates calculated by the feature point coordinates calculation device; a parameter calculation device that calculates a parameter about the image pickup device based on a result of correlation by the correlation device; a parameter storage device that stores the parameter calculated by the parameter calculation device; an embroidery data acquisition device that acquires embroidery data which indicates at least coordinates of a stitch in order to sew a piece of embroidery; a schedule information calculation device that calculates schedule information about predetermined movement at the time when the embroidery frame is moved, based on the embroidery data acquired by the embroidery data acquisition device; a movement information acquisition device that picks up the image of the embroidery frame disposed on the sewing machine bed by the image pickup device before and after the predetermined movement on which the schedule information has been calculated by the schedule information calculation device when the embroidery frame was moved based on the embroidery data acquired by the embroidery data acquisition device, and acquires movement information about movement of at least one of the embroidery frame, the work cloth, and the stitch formed in the work cloth from the picked up image; a second determination device that determines whether the movement information acquired by the movement information acquisition device matches with the schedule information calculated by the schedule information calculation device; and a second parameter correction device that: if the second determination device has determined that the movement information and the schedule information do not match with each other, picks up the image by the image pickup device; calculates the feature point coordinates by the feature point coordinates calculation device to correlate the feature point coordinates with the reference coordinates by the correlation device; calculates the parameter by the parameter calculation device; and stores the parameter calculated by the parameter calculation device in the parameter storage device.

The fifth aspect of the present disclosure provides a computer-readable storage medium storing a control program executable on a sewing machine, the program comprising, an image pickup step of picking up an image of a predetermined range over a sewing machine bed; a feature point coordinates calculation step of extracting a plurality of feature points arranged in the predetermined range from the image picked up at the image pickup step and calculating two-dimensional coordinates of the extracted feature points as feature point coordinates; a reference coordinates storage step of storing reference coordinates, which are previously measured three-dimensional coordinates of the feature points; a correlation step of correlating the reference coordinates stored at the reference coordinates storage step with the feature point coordinates calculated at the feature point coordinates calculation step; a parameter calculation step of calculating a parameter about the image pickup step based on a result of correlation at the correlation step; a parameter storage step of storing the parameter calculated at the parameter calculation step; a comparison image acquisition step of acquiring the image picked up at the image pickup step as a comparison image; a first determination step of determining whether comparison information which is based on the comparison image acquired at the comparison image acquisition step matches with parameter information which is based on a basic image which was used to calculate the parameter stored at the parameter storage step; and a first notification step of notifying that it is necessary to re-calculate the parameter if it is determined at the first determination step that the comparison information and the parameter information do not match with each other, wherein the comparison information and the parameter information which are determined at the first determination step as to whether they match with each other are respectively at least one of: the comparison image and the basic image; the feature point coordinates calculated based on the comparison image and the feature point coordinates calculated based on the basic image; and the parameter calculated based on the comparison image and the parameter stored at the parameter storage step.

The sixth aspect of the present disclosure provides a computer-readable storage medium storing a control program executable on a sewing machine, the program comprising, an image pickup step of picking up an image of a predetermined range over a sewing machine bed; a feature point coordinates calculation step of extracting a plurality of feature points arranged in the predetermined range from the image picked up at the image pickup step and calculating two-dimensional coordinates of the extracted feature points as feature point coordinates; a reference coordinates storage step of storing reference coordinates, which are previously measured three-dimensional coordinates of the feature points; a correlation step of correlating the reference coordinates stored at the reference coordinates storage step with the feature point coordinates calculated at the feature point coordinates calculation step; a parameter calculation step of calculating a parameter about the image pickup step based on a result of correlation at the correlation step; a parameter storage step of storing the parameter calculated at the parameter calculation step; a comparison image acquisition step of acquiring the image picked up at the image pickup step as a comparison image; a first determination step of determining whether comparison information which is based on the comparison image acquired at the comparison image acquisition step matches with parameter information which is based on a basic image which was used to calculate the parameter stored at the parameter storage step; a parameter re-calculation step of calculating the feature point coordinates with respect to the comparison image at the feature point coordinates calculation step, correlating the feature point coordinates calculated at the correlation step with the reference coordinates, and calculating the parameter based on a result of correlation at the parameter calculation step; and a first parameter correction step of storing the parameter calculated at the parameter re-calculation step if it is determined at the first determination step that the comparison information and the parameter information do not match with each other, wherein the comparison information and the parameter information which are determined at the first determination step as to whether they match with each other are respectively at least one of: the comparison image and the basic image; the feature point coordinates calculated based on the comparison image and the feature point coordinates calculated based on the basic image; and the parameter calculated based on the comparison image and the parameter stored at the first parameter correction step.

The seventh aspect of the present disclosure provides a computer-readable storage medium storing a control program executable on a sewing machine, the program comprising, an image pickup step of picking up an image of a predetermined range over a sewing machine bed; a feature point coordinates calculation step of extracting a plurality of feature points arranged in the predetermined range from the image picked up at the image pickup step and calculating two-dimensional coordinates of the extracted feature points as feature point coordinates; a reference coordinates storage step of storing reference coordinates, which are previously measured three-dimensional coordinates of the feature points; a correlation step of correlating the reference coordinates stored at the reference coordinates storage step with the feature point coordinates calculated at the feature point coordinates calculation step; a parameter calculation step of calculating a parameter about the image pickup step based on a result of correlation at the correlation step; a parameter storage step of storing the parameter calculated at the parameter calculation step; an embroidery data acquisition step of acquiring embroidery data which indicates at least coordinates of a stitch in order to sew a piece of embroidery; a schedule information calculation step of calculating schedule information about predetermined movement at the time when an embroidery frame is moved, based on the embroidery data acquired at the embroidery data acquisition step; a movement information acquisition step of picking up the image of the embroidery frame disposed on the sewing machine bed by the image pickup step before and after the predetermined movement on which the schedule information has been calculated by the schedule information calculation step when the embroidery frame was moved based on the embroidery data acquired by the embroidery data acquisition step, and acquiring movement information about movement of at least one of the embroidery frame, the work cloth, and the stitch formed in the work cloth from the picked up image; a second determination step of determining whether the movement information acquired at the movement information acquisition step matches with the schedule information calculated at the schedule information calculation step; and a second notification step of notifying that it is necessary to re-calculate the parameter if it is determined at the second determination step that the movement information and the schedule information do not match with each other.

The eighth aspect of the present disclosure provides a computer-readable storage medium storing a control program executable on a sewing machine, the program comprising, an image pickup step of picking up an image of a predetermined range over a sewing machine bed; a feature point coordinates calculation step of extracting a plurality of feature points arranged in the predetermined range from the image picked up at the image pickup step and calculating two-dimensional coordinates of the extracted feature points as feature point coordinates; a reference coordinates storage step of storing reference coordinates, which are previously measured three-dimensional coordinates of the feature points; a correlation step of correlating the reference coordinates stored at the reference coordinates storage step with the feature point coordinates calculated at the feature point coordinates calculation step; a parameter calculation step of calculating a parameter about the image pickup step based on a result of correlation at the correlation step; a parameter storage step of storing the parameter calculated at the parameter calculation step; an embroidery data acquisition step of acquiring embroidery data which indicates at least coordinates of a stitch in order to sew a piece of embroidery; a schedule information calculation step of calculating schedule information about predetermined movement at the time when an embroidery frame is moved, based on the embroidery data acquired at the embroidery data acquisition step; a movement information acquisition step of picking up the image of the embroidery frame disposed on the sewing machine bed by the image pickup step before and after the predetermined movement on which the schedule information has been calculated by the schedule information calculation step when the embroidery frame was moved based on the embroidery data acquired by the embroidery data acquisition step, and acquiring movement information about movement of at least one of the embroidery frame, the work cloth, and the stitch formed in the work cloth from the picked up image; a second determination step of determining whether the movement information acquired at the movement information acquisition step matches with the schedule information calculated at the schedule information calculation step; and a second parameter correction step of, if it is determined at the second determination step that the movement information and the schedule information do not match with each other, picking up the image by the image pickup step, calculating the feature point coordinates at the feature point coordinates calculation step to correlate the feature point coordinates with the reference coordinates by the correlation step, calculating the parameter by the parameter calculation step; and storing the parameter calculated by the parameter calculation step.

BRIEF DESCRIPTION OF THE DRAWINGS

Exemplary embodiments of the invention will be described below in detail with reference to the accompanying drawings in which:

FIG. 5 is a table of a configuration of two-dimensional feature point coordinates storage areas arranged in the RAM;

FIG. 7 is a table of a configuration of three-dimensional feature point coordinates storage areas arranged in the EEPROM;

FIG. 15 is a table of a configuration of three-dimensional feature point coordinates storage areas in accordance with a modification;

DETAILED DESCRIPTION

Figure 1:
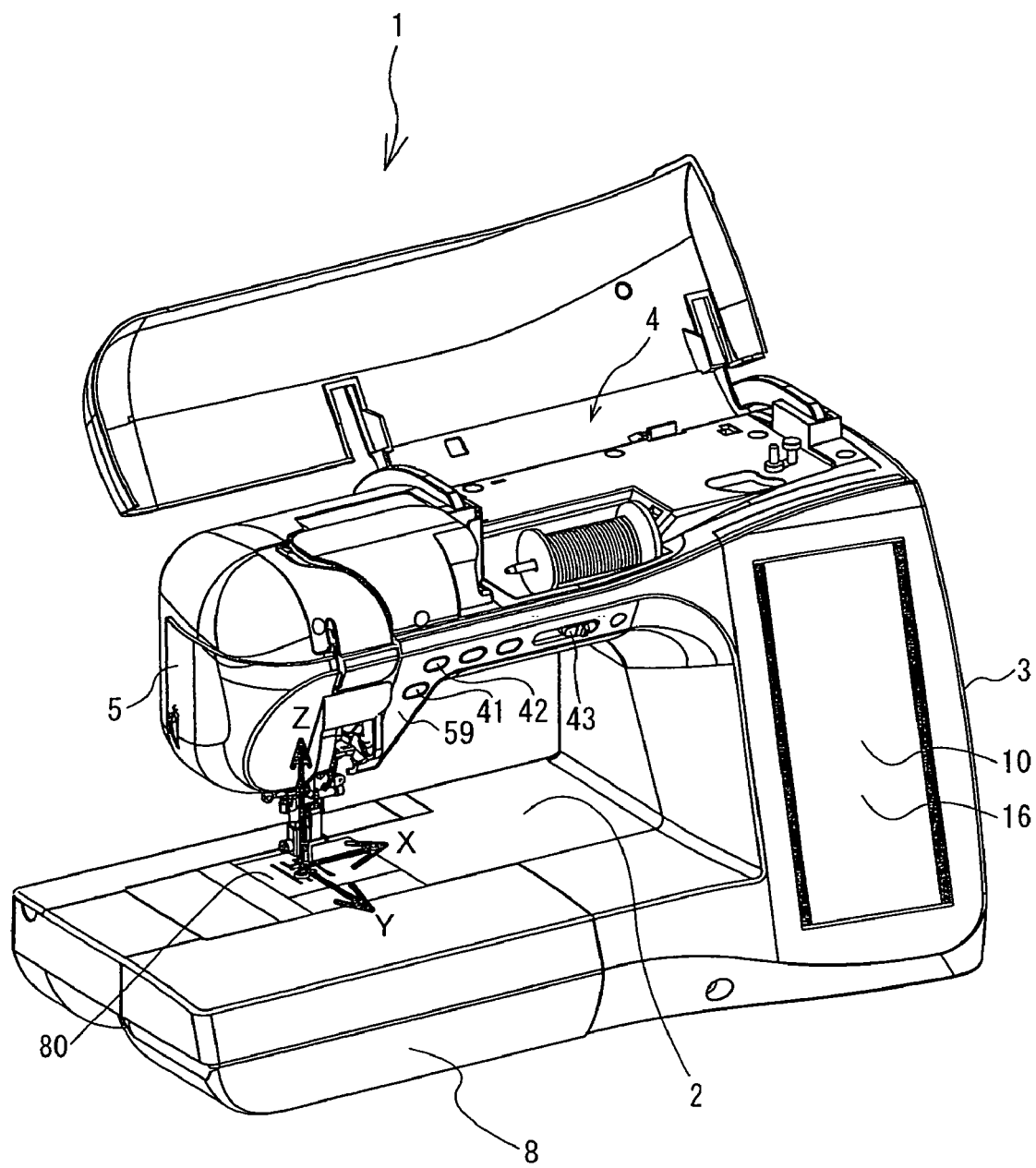
FIG. 1 is a perspective view of a sewing machine as viewed from above.

The following will describe embodiments of the present disclosure with reference to the drawings. The physical and electrical configurations of a sewing machine 1 will be described below with reference to FIGS. 1 to 3. First, the physical configuration of the sewing machine 1 will be described with reference to FIG. 1. As shown in FIG. 1, the sewing machine 1 includes a sewing machine bed 2, a pillar 3, an arm 4, and a head 5. The sewing machine bed 2 extends long in the right and left direction. The pillar 3 is erected upward at the right end portion of the sewing machine bed 2. The arm 4 extends leftwards at the upper end of the pillar 3. The head 5 is provided at the left end portion of the arm 4. The pillar 3 has on its front surface portion a liquid crystal display (LCD) 10 equipped with a touch panel 16 on its surface. The LCD 10 displays input keys for inputting a sewing pattern, sewing conditions, etc. By touching positions corresponding to these input keys on the touch panel 16, the user can select a sewing pattern, sewing conditions, etc. The sewing machine I contains a sewing machine motor 79 (see FIG. 3), a drive shaft (not shown), a needle bar 6 (see FIG. 2), a needle bar up-and-down movement mechanism (not shown), a needle bar swinging mechanism (not shown), etc. At the lower end portion of the needle bar 6, a sewing needle 7 is mounted. The needle bar up-and-down movement mechanism is used to move the needle bar 6 up and down. The needle bar swinging mechanism is used to swing the needle bar 6 in the right-and-left direction. In FIG. 1, the direction of an arrow X is referred to as the right direction and its opposite direction is referred to as the left direction; and the direction of an arrow Y is referred to as the front direction and its opposite direction is referred to as the rear direction.

On the top portion of the sewing machine bed 2, a needle plate 80 (see FIG. 8) is disposed. The sewing machine bed 2 contains a feed dog back-and-forth movement mechanism (not shown), a feed dog up-and-down movement mechanism (not shown), a feed adjustment pulse motor 78 (see FIG. 3), a shuttle (not shown), etc. The feed dog back-and-forth movement mechanism and the feed dog up-and-down movement mechanism drive a feed dog. The feed adjustment pulse motor 78 adjusts a distance by which work cloth is fed by the feed dog. The shuttle houses a bobbin around which a bobbin thread is wound. At the left end of the sewing machine bed 2, a side table 8 is fitted. The side table 8 is detachable. If the side table 8 is detached, an embroidery apparatus 30 can be attached to the sewing machine bed 2 instead (see FIG. 11).

On the right side surface of the sewing machine 1, a pulley (not shown) is mounted which is used to rotate the drive shaft by hand so that the needle bar 6 may be moved up and down. On the front surface of the head 5 and the arm 4, a front surface cover 59 is mounted. On the front cover 59 are mounted a sewing start-and-stop switch 41, a reverse switch 42, and other operation switches. The sewing start-and-stop switch 41 is used to instruct the sewing machine 1 to start and stop its operations, that is, to start and stop sewing. The reverse switch 42 is used to feed work cloth in the reverse direction, that is, from the rear side to the front side. The front surface cover 59 is mounted thereon with a speed adjustment knob 43 with which to adjust a rotation speed of the drive shaft. Under the front surface cover 59, at the diagonally upward right position of the sewing needle 7, an image sensor 50 (see FIG. 2) is mounted. The image sensor 50 can pick up an image of the entirety of the needle plate 80. If the sewing start-and-stop switch 41 is pressed when the sewing machine 1 is paused, it starts operations; and if that switch is pressed when the sewing machine 1 is operating, it stops operations.

Figure 2:
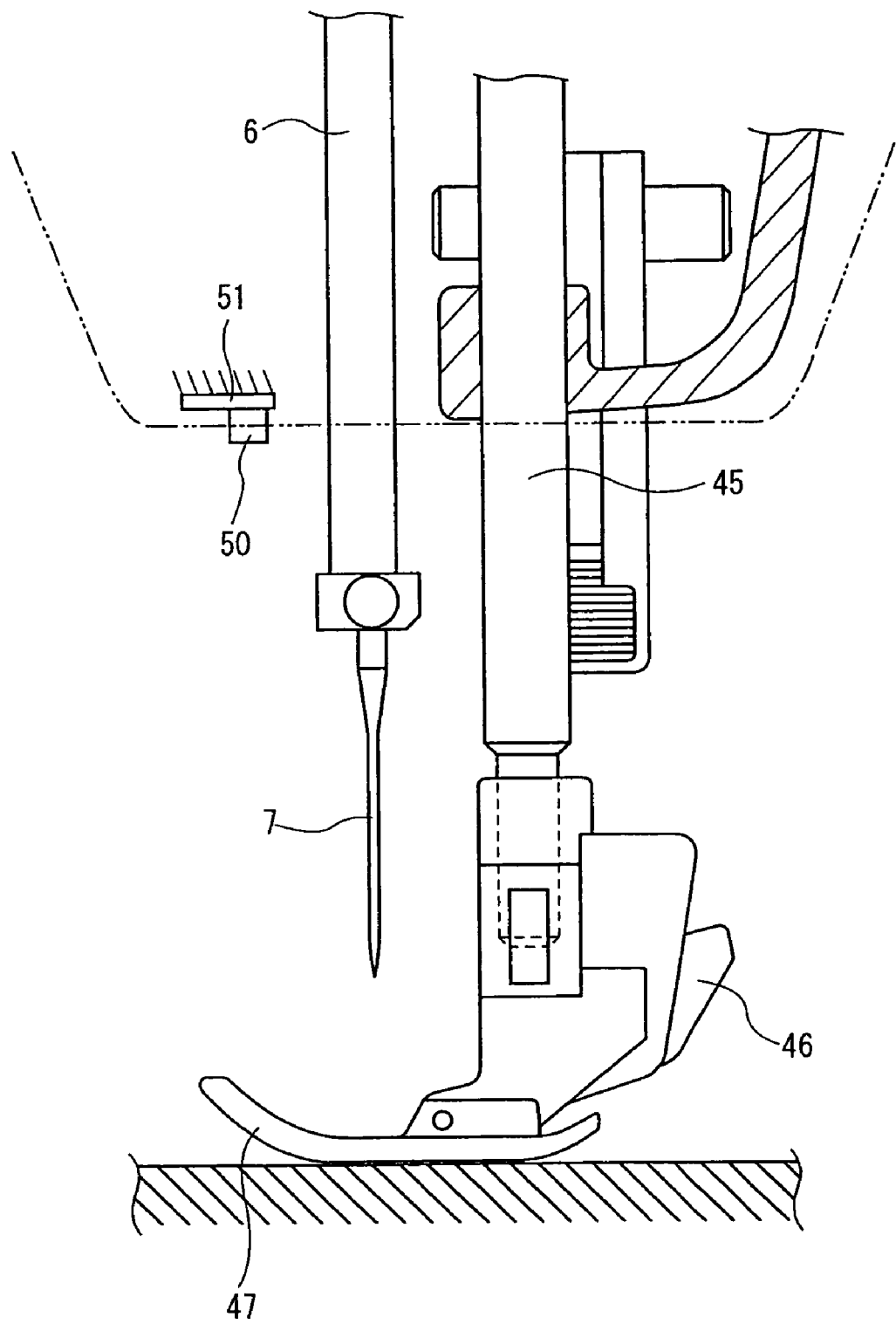
FIG. 2 is a schematic view of an image sensor.

Next, the image sensor 50 will be described below with reference to FIG. 2. The image sensor 50 is a known CMOS image sensor and picks up an image. In the present embodiment, as shown in FIG. 2, a support frame 51 is attached to a frame, not shown, of the sewing machine 1. To the support frame 51, the image sensor 50 is mounted in such a manner that it can pick up an image of the needle plate 80 as a whole. Hereinafter, an image picked up by the image sensor 50 is referred to as a "picked up image". Also, a point on work cloth at which the sewing needle 7 is stuck into it as being moved downward by the needle bar up-and-down movement mechanism is referred to as a "needle drop point". At the lower end portion of a presser bar 45, a presser holder 46 is fixed. The presser holder 46 is mounted with a presser foot 47, which holds down work cloth. It should be noted that the image sensor 50 may be a CCD camera or any other image pickup device instead of a CMOS image sensor.

Figure 3:
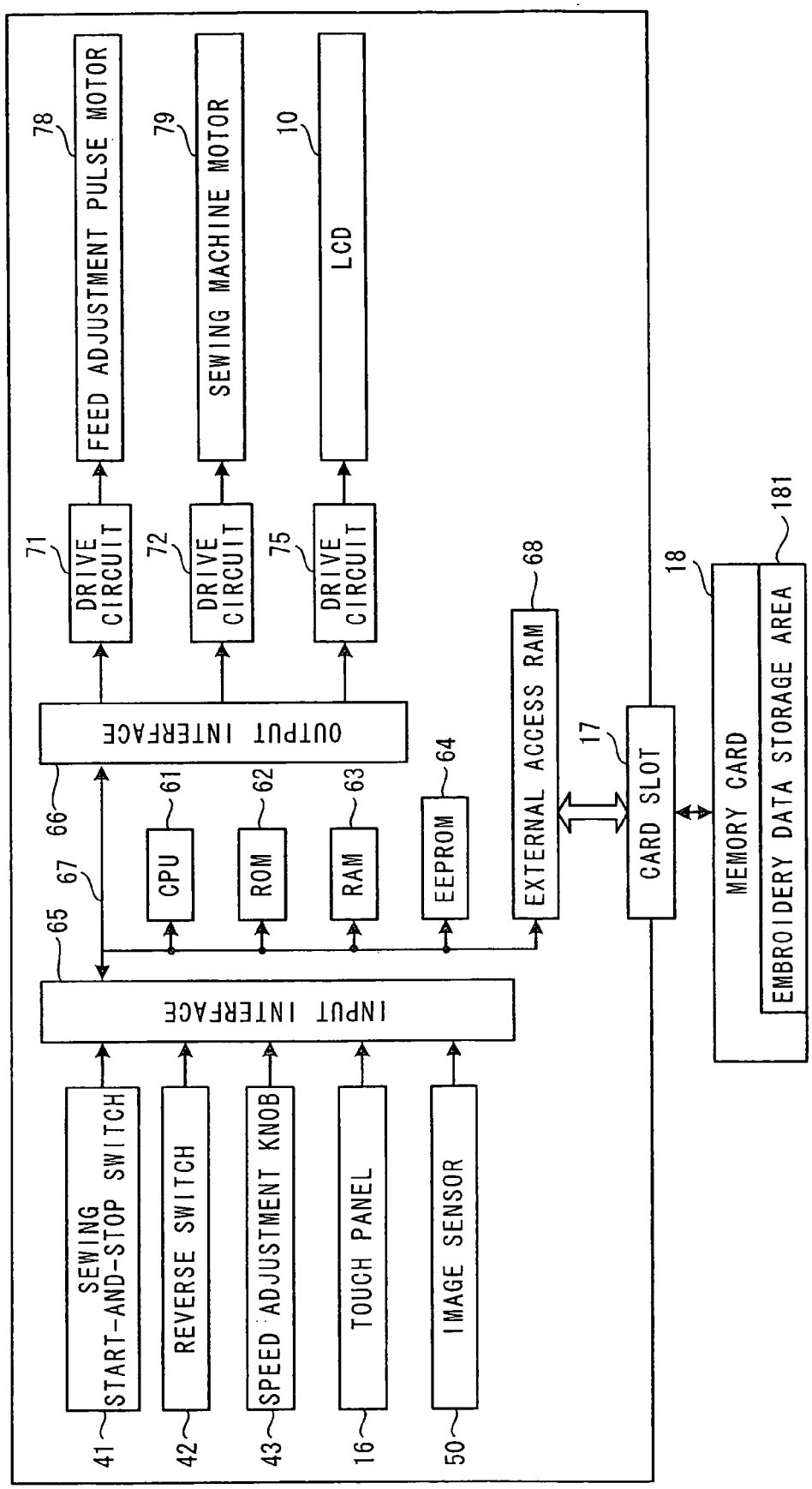
FIG. 3 is a block diagram of an electrical configuration of the sewing machine.

Next, the electrical configuration of the sewing machine 1 will be described below with reference to FIG. 3. As shown in FIG. 3, the sewing machine 1 comprises a CPU 61, a ROM 62, a RAM 63, an EEPROM 64, a card slot 17, an external access RAM 68, an input interface 65, an output interface 66, etc., which are connected to each other with a bus 67. To the input interface 65 are connected the sewing start-and-stop switch 41, the reverse switch 42, the speed adjustment knob 43, the touch panel 16, the image sensor 50, etc. To the output interface 66 are connected drive circuits 71, 72, and 75 electrically. The drive circuit 71 is used to drive the feed adjustment pulse motor 78. The drive circuit 72 is used to drive the sewing machine motor 79, which rotary-drives the drive shaft. The drive circuit 75 is used to drive the LCD 10. Into the card slot 17, a memory card 18 can be connected. The memory card 18 has an embroidery data storage area 181 to store embroidery data which is used to sew a piece of embroidery in the sewing machine 1. In the embroidery data, coordinates that indicate a needle drop point of the sewing needle 7 are described in three-dimensional coordinates in the later-described world coordinate system.

The CPU 61 conducts main control over the sewing machine 1 and executes various kinds of operations and processing in accordance with a control program stored in a control program storage region in the ROM 62. The RAM 63, which is a random access memory, includes a variety of storage regions as required in which to store results of operations performed by the CPU 61.

Figure 4:
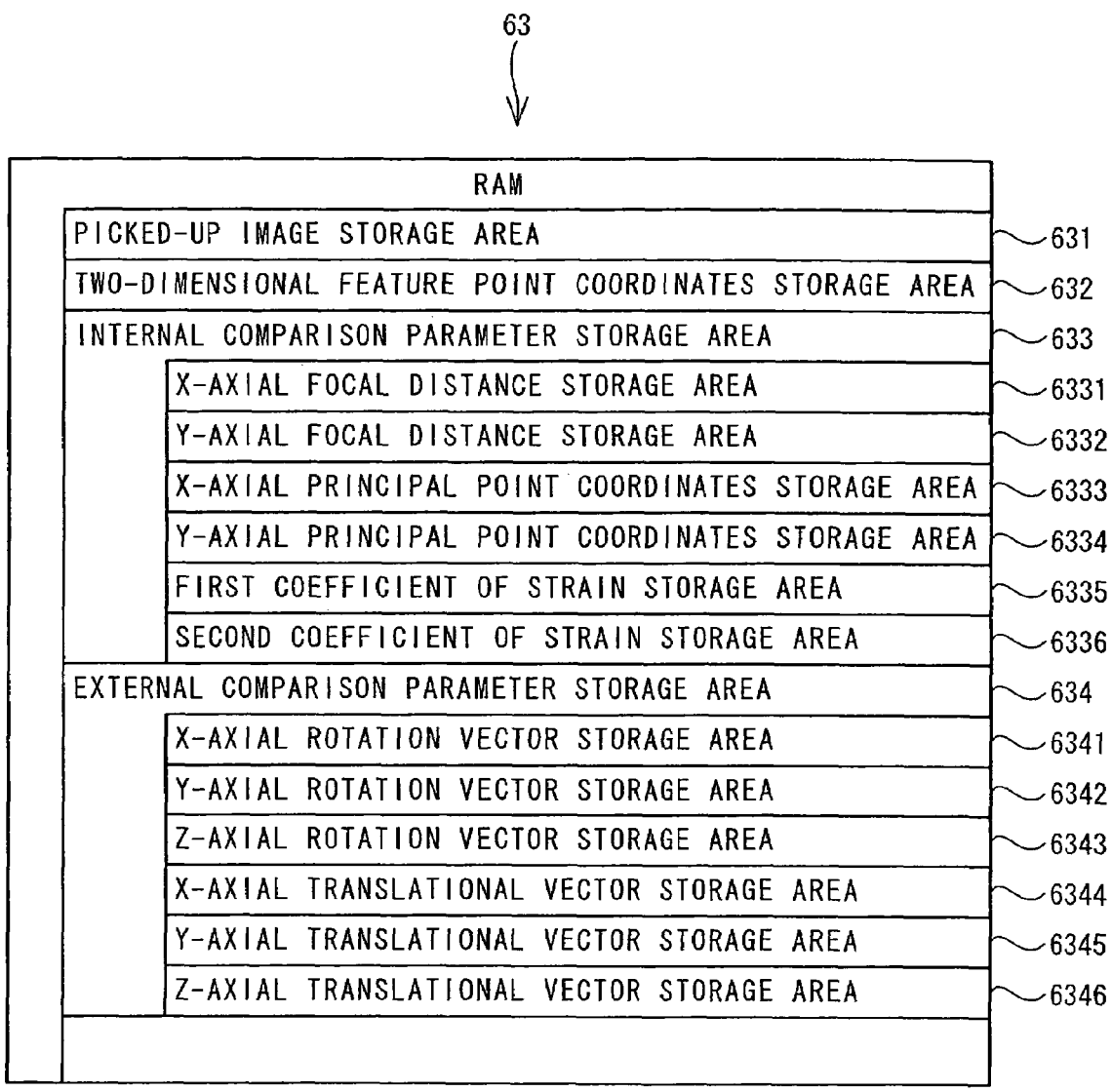
FIG. 4 is a diagram of a configuration of storage areas arranged in an RAM.

Next, the storage areas arranged in the RAM 63 and the EEPROM 64 will be described below with reference to FIGS. 4 to 7. First, the storage areas arranged in the RAM 63 will be described below with reference to FIG. 4. As shown in FIG. 4, the RAM 63 includes a picked-up image storage area 631, a two-dimensional feature point coordinates storage area 632, an internal comparison parameter storage area 633, and an external comparison parameter storage area 634. The picked-up image storage area 631 stores an image picked up by the image sensor 50. The two-dimensional feature point coordinates storage area 632 stores the two-dimensional coordinates of a feature point extracted from the image picked up by the image sensor 50. The internal comparison parameter storage area 633 stores an internal parameter. The internal parameter is used so as to be compared with an internal parameter which is stored in an internal parameter storage area 642 of the EEPROM 64 and currently being used. The external comparison parameter storage area 634 stores an external parameter. This external parameter is used so as to be compared with an external parameter which is stored in an external parameter storage area 643 of the EEPROM 64 and currently being used. Although not shown, other storage areas than those are arranged in the RAM 63.

The two-dimensional feature point coordinates storage area 632 arranged in the RAM 63 will be described below with reference to FIG. 5. As shown in FIG. 5, the two-dimensional feature point coordinates storage area 632 stores two-dimensional coordinates (X-coordinate, Y-coordinate) corresponding to each of feature point numbers. In the present embodiment, 28 feature points of feature point numbers "0" through "27" will be used. It should be noted that a feature point refers to a point set to the corner of a hole or the extreme point of a punch mark formed in the needle plate 80. More details will be described later with reference to FIGS. 8 and 9.

Figure 6:
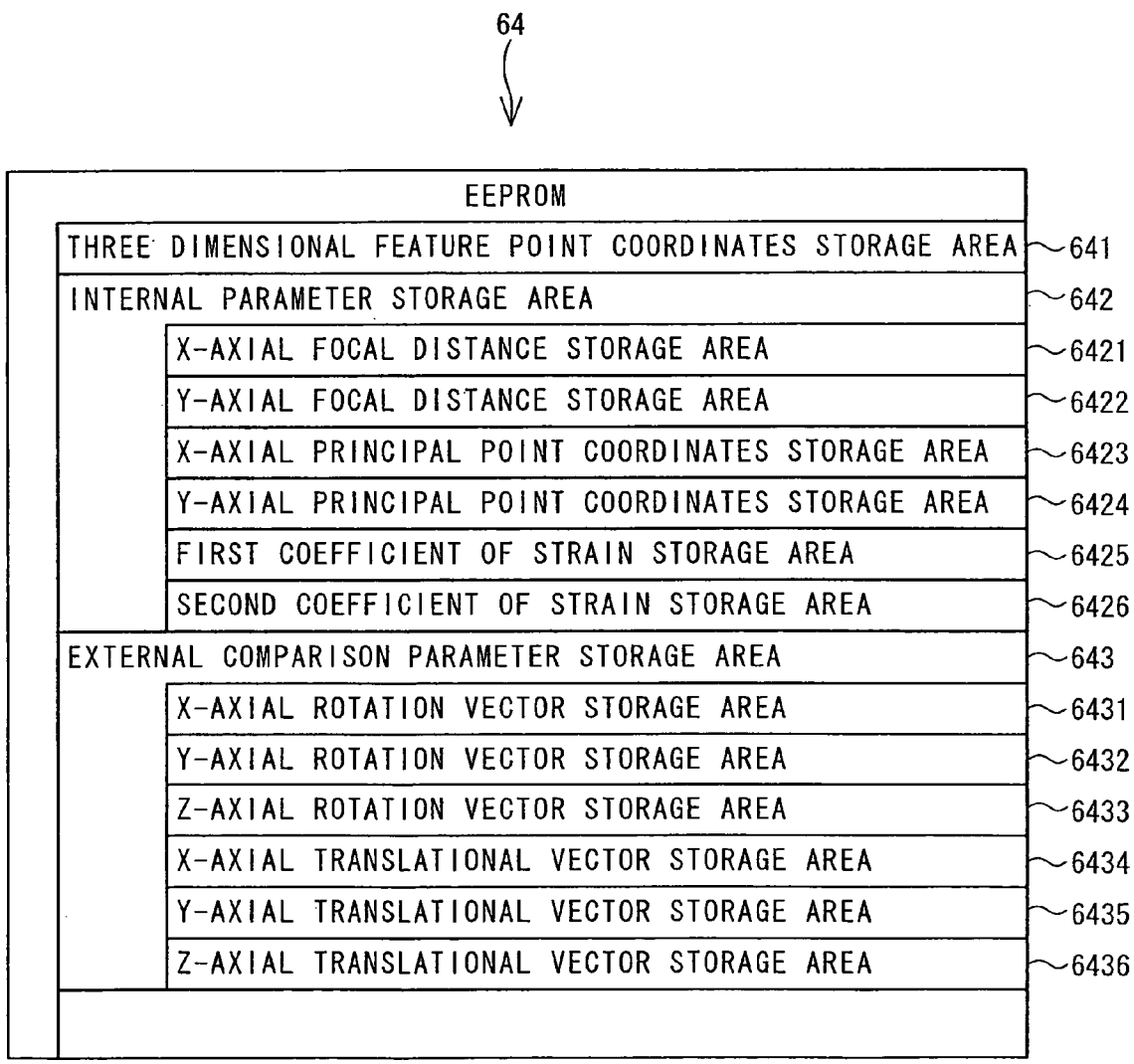
FIG. 6 is a diagram of a configuration of storage areas arranged in an EEPROM.

Next, the storage areas arranged in the EEPROM 64 will be described below with reference to FIG. 6. The EEPROM 64 includes a three-dimensional feature point coordinates storage area 641, an internal parameter storage area 642, and an external parameter storage area 643. The three-dimensional feature point coordinates storage area 641 stores the three-dimensional coordinates of a feature point in the world coordinate system which are calculated beforehand. The world coordinate system refers to a three-dimensional coordinate system which is used mainly in the field of three-dimensional graphics and which represents the entirety of a space so as not to be influenced by the gravity etc. of an object. Accordingly, the world coordinate system is utilized to indicate the location of an object or compare coordinates of different objects in the space. In the present embodiment, as shown in FIG. 1, the top surface of the sewing machine bed 2 is defined as an XY plane and a point having feature point No. "0" (feature point 100 shown in FIG. 9) is defined as an origin (0, 0, 0), thereby establishing a world coordinate system. The up-and-down direction, the right-and-left direction, and the front-and-rear direction of the sewing machine 1 are defined as a Z-axis, an X-axis, and a Y-axis, respectively.

The internal parameter storage area 642 includes an X-axial focal distance storage area 6421, a Y-axial focal distance storage area 6422, an X-axial principal point coordinates storage area 6423, a Y-axial principal point coordinates storage area 6424, a first coefficient of strain storage area 6425, and a second coefficient of strain storage area 6426. The external parameter storage area 643 includes an X-axial rotation vector storage area 6431, a Y-axial rotation vector storage area 6432, and a Z-axial rotation vector storage area 6433, an X-axial translational vector storage area 6434, a Y-axial translational vector storage area 6435, and a Z-axial translational vector storage area 6436. The internal parameter storage area 642 and the external parameter storage area 643, respectively store an internal parameter and an external parameter which are calculated from a picked-up image and three-dimensional coordinates of a feature point in it. Those parameters are used to process an image picked up by the image sensor 50 as well as to convert two-dimensional coordinates into three-dimensional coordinates and vice versa.

Next, the three-dimensional feature point coordinates storage area 641 arranged in the EEPROM 64 will be described below with reference to FIG. 7. As shown in FIG. 7, the three-dimensional feature point coordinates storage area 641 stores three-dimensional coordinates (X-coordinate, Y-coordinate, Z-coordinate) in the world coordinate system corresponding to each of feature point numbers.

Figure 8:
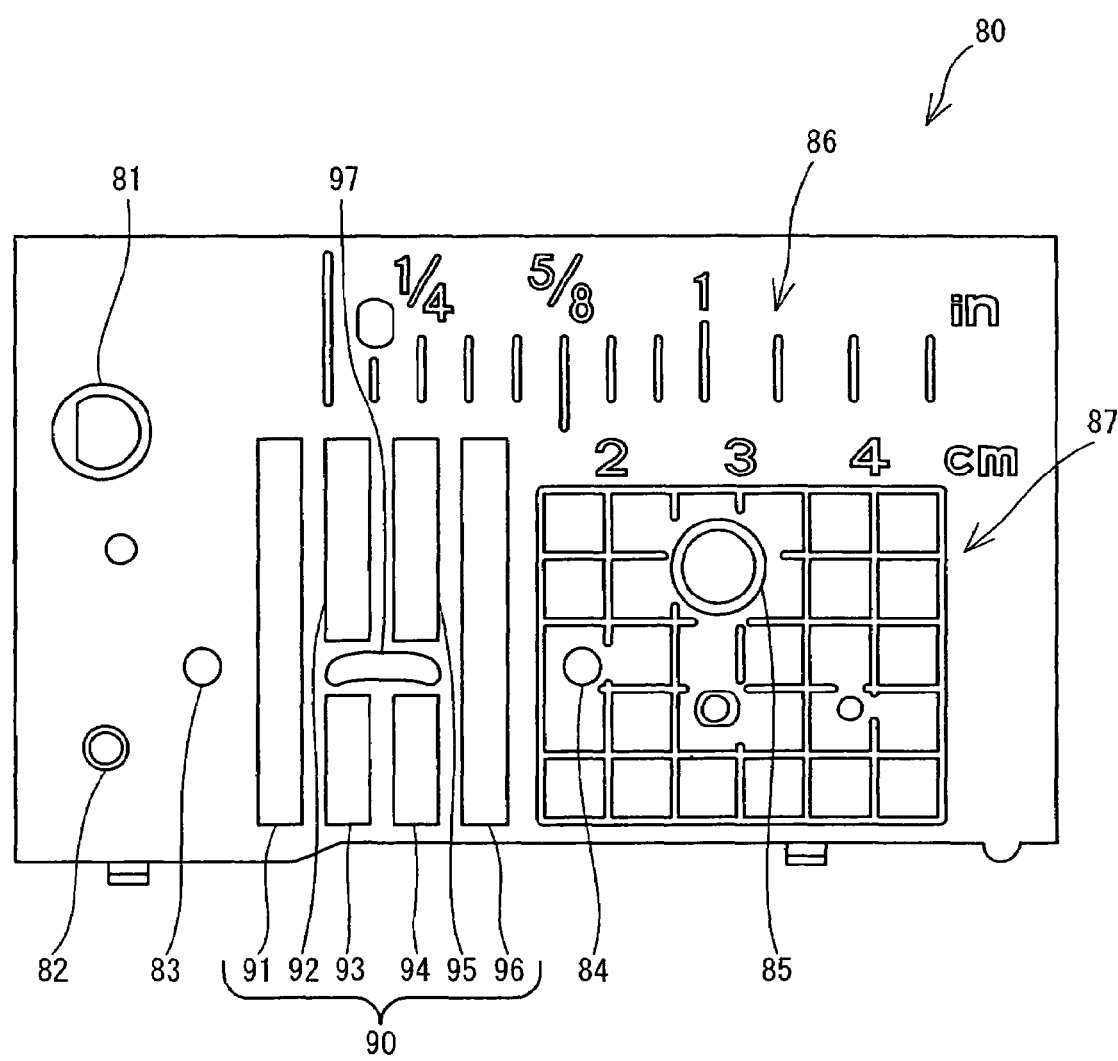
FIG. 8 is a plan view of a needle plate.
Figure 9:
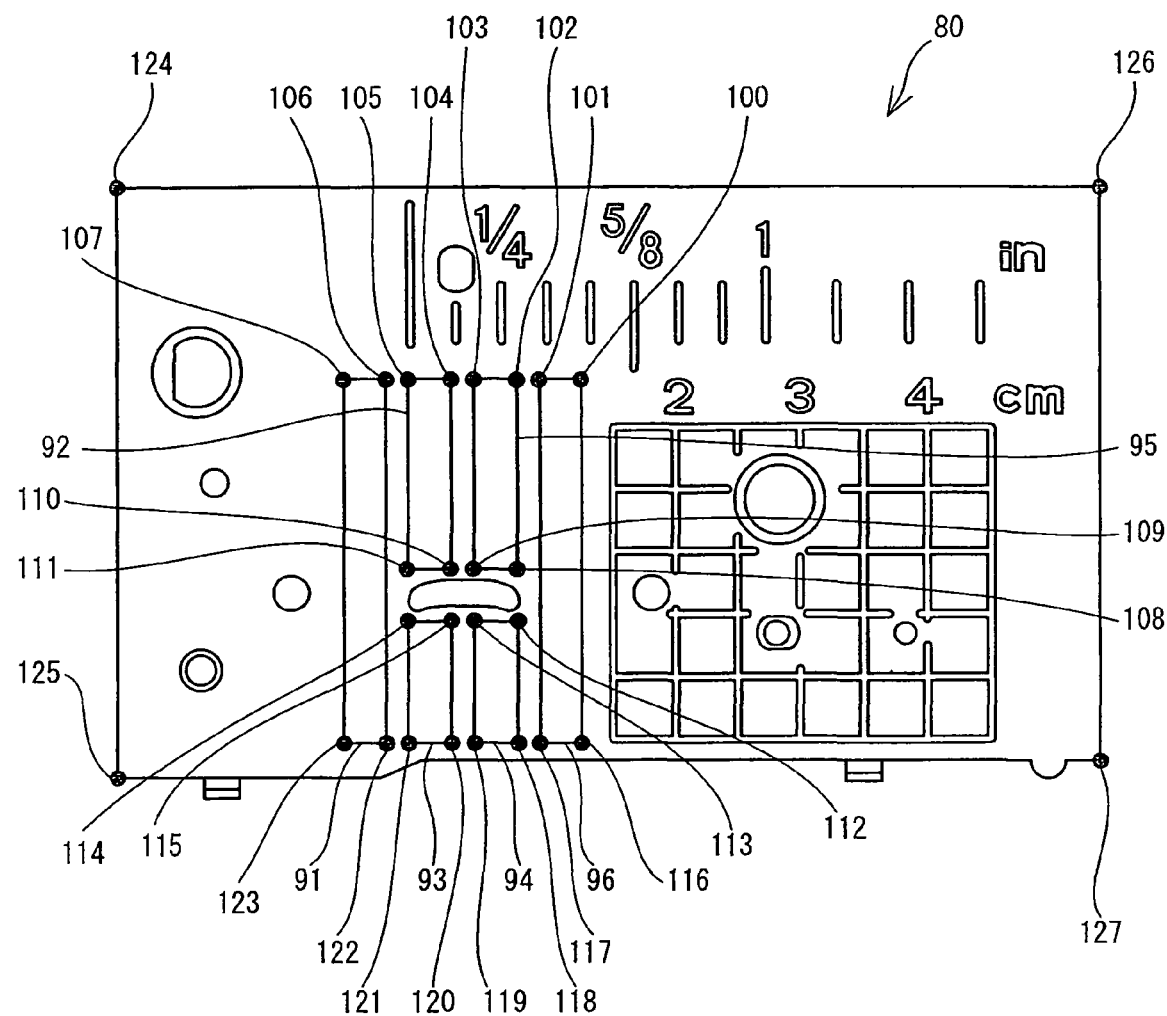
FIG. 9 is a schematic view of feature points on the plan view of the needle plate.

Next, feature points which are set on the needle plate 80 will be described below with reference to FIGS. 8 and 9. As shown in FIG. 8, the needle plate 80 has a roughly rectangular shape. As shown in FIG. 1, the needle plate 80 is fitted into the top surface of the sewing machine bed 2 directly below the presser foot 47 and the sewing needle 7. As shown in FIG. 8, the needle plate 80 has a feed dog hole 90 formed in it. The feed dog hole 90 is formed so that a feed dog (not shown) mounted in the sewing machine bed 2 may appear out of, and disappear from the sewing machine bed 2. In sewing, the feed dog appears out of the feed dog hole 90 and moves the back-and-forth and up-and-down directions, thereby feeding work cloth in its sewing direction. It should be noted that in the up-and-down direction in FIG. 8, the feed dog moves and the work cloth is sewn. The feed dog hole 90 comprises roughly rectangular feed dog holes 91 to 96 in a condition where the feed dog moving direction is defined as the longitudinal direction. At a position surrounded by the feed dogs 91 to 96, a needle hole 97 is formed through which the sewing needle 7 can be inserted. Besides the feed dog 90, holes 81 to 85 are formed at various positions. The holes 81 to 85 are formed for countersunk screws which are used to attach to the needle plate 80 sewing assisting attachments (not shown) such as a needle plate cover which covers the feed dog holes 91 to 96, a guide ruler which guides the cloth end of work cloth, a side cutter which sews the work cloth as cutting it off, and a circular sewing apparatus which sews a circular pattern, and which are also used to fix the needle plate 80 to the sewing machine bed 2. On the needle plate 80, a base line 87 and a scale mark 86 are formed which are used as a standard on which to measure a distance from the end of work cloth to a needle drop point and a standard with which to feed the work cloth linearly.

Next, the locations of feature points in the present embodiment will be described below. In FIG. 9, the feature points are indicated by a black dot. As shown in FIG. 9, feature points 100 to 127 are disposed to the vertexes (four corners) of each of the feed dog holes 91 to 96 and the vertexes (four corners) of the needle plate 80, respectively. The feature points 107, 106, 123, and 122 are disposed to the upper left, upper right, lower left, and lower right vertexes of the feed dog hole 91 in this order. The feature points 105, 104, 111, and 110 are disposed to the upper left, upper right, lower left, and lower right vertexes of the feed dog hole 92 in this order. The feature points 114, 115, 121, and 120 are disposed to the upper left, upper right, lower left, and lower right vertexes of the feed dog hole 93 in this order. The feature points 113, 112, 119, and 118 are disposed to the upper left, upper right, lower left, and lower right vertexes of the feed dog hole 94 in this order. The feature points 103, 102, 109, and 108 are disposed to the upper left, upper right, lower left, and lower right vertexes of the feed dog hole 95 in this order. The feature points 101, 100, 117, and 116 are disposed to the upper left, upper right, lower left, and lower right vertexes of the feed dog hole 96 in this order. The feature points 124, 126, 125, and 127 are disposed to the upper left, upper right, lower left, and lower right vertexes of the needle plate 80 in this order. The feature points 100 to 127 correspond to feature point numbers "0" through "27", respectively.

Figure 10:
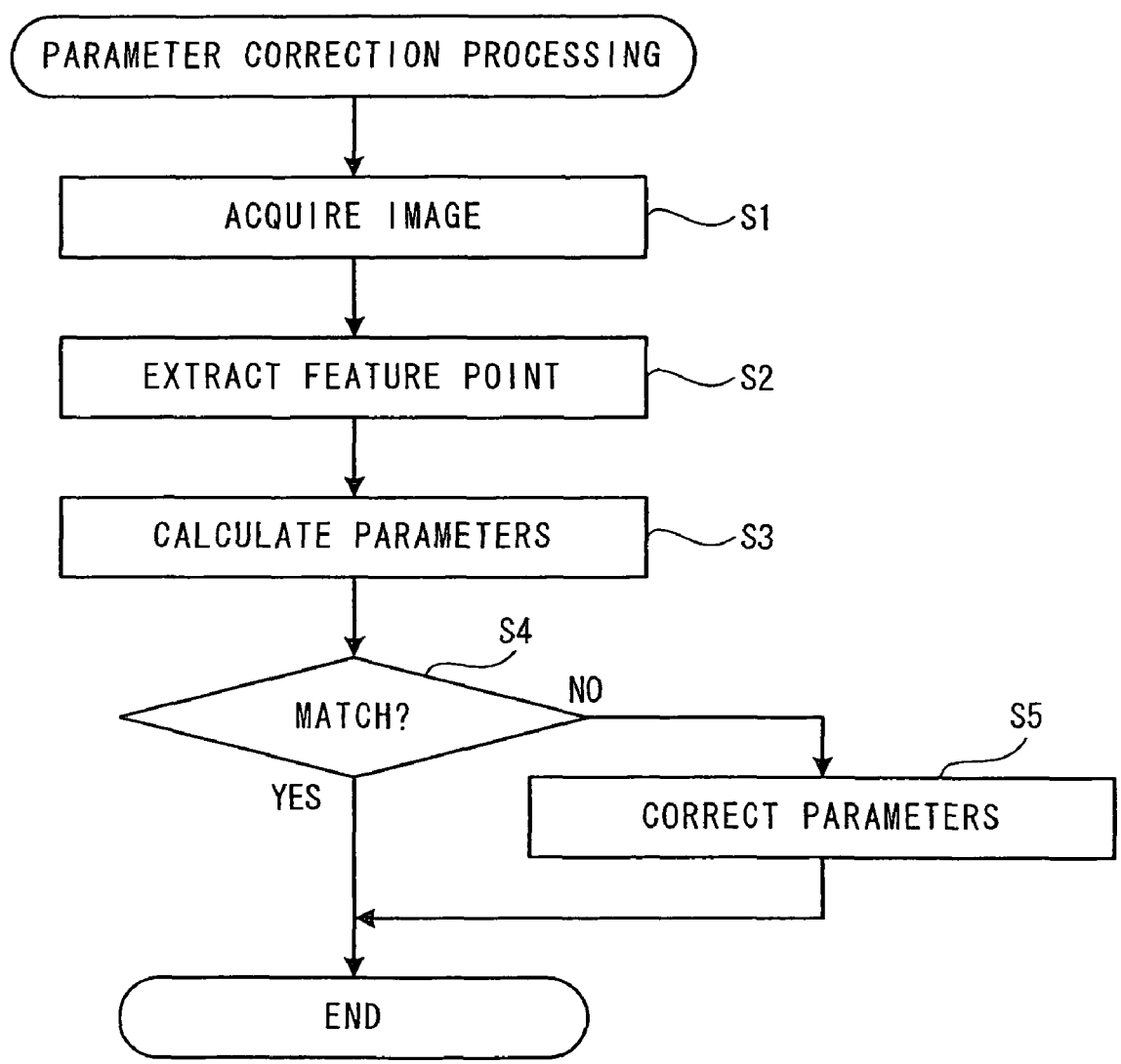
FIG. 10 is a flowchart of parameter correction processing.

Next, parameter correction processing will be described below with reference to a flowchart of FIG. 10. The parameter correction processing will be carried out if a user gives an instruction of "parameter correction" to permit the CPU 61 to execute a parameter correction program stored in the ROM 62. An instruction for the performance of parameter correction may be accepted by the user when the user touches a position on the touch panel 16 corresponding to the position of an instruction button for the performance of parameter correction that is displayed on the LCD 10. Or a dedicated button may be provided which is used to cause execution of parameter correction. Also, the sewing machine 1 may be arranged to automatically execute parameter correction periodically. Further, for example, parameter correction may be executed when power is applied to the sewing machine 1 or when a predetermined time period has elapsed after sewing ended. Also further, the number of times the needle bar 6 has moved up and down (that is, the number of stitches) may be counted so that each time the cumulative number of times reaches a predetermined number of times, parameter may be carried out.

In the parameter correction processing, first an image to be used in parameter correction is acquired (S1). Specifically, an image of the needle plate 80 is picked up by the image sensor 50 and stored in the picked-up image storage area 631 of the RAM 63. Subsequently, feature points are extracted from this picked-up image and their coordinates are stored in the two-dimensional feature point coordinates storage area 632 of the RAM 63 (S2). Specifically, first a plurality of straight lines are extracted from the picked-up image stored in the picked-up image storage area 631. These straight lines are extracted by, for example, a known Hough transform method. Sobel filtering processing is performed on the picked-up image, to create an edge intensity image (image in which a position having a steep change in image density is highlighted). Next, the edge intensity image is binarized to edge dot sequence image. Next, Hough transform is performed on the intensity image to create a Hough-transformed image. Next, non-maximal suppression processing is performed on the Hough-transformed image to extract dots that are locally bright (in a mask) from the Hough-transformed image. Next, threshold value processing is carried out to extract only those of the extracted bright dots that are brighter than a predetermined threshold value. Next, inverse Hough transform is performed to extract straight lines. It should be noted that if no straight lines can be extracted, the needle plate 80 or the feed dog hole 90 on which the feature points 100 to 127 are disposed may possibly be hidden by foreign matter, so that an alarm message saying, for example, "Do not place anything on the needle plate" will be output to the LCD 10.

Subsequently, the process calculates the coordinates of intersection points between the extracted straight lines. The coordinates of the intersection points that correspond to the feature points out of those intersections whose coordinates have been calculated are stored in the two-dimensional feature point coordinates storage area 632 in a condition where they are correlated with the feature point numbers. It should be noted that the corresponding relation between the calculated coordinates of the intersections and the coordinates of the feature points is determined, for example, by the following manner. Since the feature points 100 to 127 on the needle plate 80 are determined beforehand, the coordinates of the feature points 100 to 127 in an image picked up by the image sensor 50 at a certain stage (for example, before shipment from a sewing machine manufacturer) are stored into the ROM 62 or the EEPROM 64 in a condition where they are correlated with the feature point numbers. Or it is assumed that the coordinates of the feature points 100 to 127 are written as comparison values in a parameter calculation program beforehand. Then, the intersection closest to the coordinates of each of the feature points written in the ROM 62, the EEPROM 64, or the parameter calculation program is defined as the coordinates of a feature point in the picked-up image. By thus correlating two-dimensional coordinates of the feature points calculated from the picked-up image with the feature point numbers, those coordinates can be permitted to correspond to three-dimensional coordinates of the feature points stored in the three-dimensional feature point coordinates storage area 641 in a condition where they are correlated with the feature point numbers. It should be noted that if a total number of the intersections whose coordinates have been calculated is less than a total number of the feature points numbers, the needle plate 80 or the feed dog hole 90 having feature points 100 to 127 may possibly be hidden by foreign matter, so that an alarm message saying, for example, "Do not place anything on the needle plate" will be output to the LCD 10.

Subsequently, parameters are calculated and stored in the internal comparison parameter storage area 633 and the external comparison parameter storage area 634 of the RAM 63 (S3). The parameters are calculated by a known camera calibration parameter calculation method based on a combination of the two-dimensional coordinates of the feature points calculated at S2 (see FIG. 5) and the three-dimensional coordinates of the feature points stored in the three-dimensional feature point coordinates storage area 641 of the EEPROM 64 (see FIG. 7). The parameter calculation method involves picking up a subject containing points (feature points) whose three-dimensional coordinates are known by a camera, calculating two-dimensional coordinates of the feature points in the picked-up image, obtaining a projection matrix based on the known three-dimensional coordinates and the calculated two-dimensional coordinates, and obtaining the parameters from the projection matrix. This calculation method has been studied to propose various calculation methods (see, for example, BACKGROUND of Japanese Patent Application Laid-Open Publication No. 3138080). In the present embodiment, any one of the calculation methods may be used, in any case of which the needle plate 80 will be used as a subject containing points whose three-dimensional coordinates are known.

An internal parameter is used to correct a shift in focal distance, principal point coordinates or strain of a picked-up image which are caused by the properties of the image sensor 50. In the present embodiment, the following six internal parameters will be calculated: X-axial focal distance, Y-axial focal distance, X-axial principal point coordinate, Y-axial principal point coordinate, first coefficient of strain, and second coefficient of strain. It should be noted that in the case of using an image picked up by the image sensor 50, if the center position of the picked-up image is unclear or the pixels of the image sensor 50 are not square-shaped, problems occur that the two coordinate axes of the image may have different scales or may not always be orthogonal to each other. In order to eliminate these problems, the concept of a "normalization camera" will be introduced which picks up images at a position which is a unit length away from its focal point in a condition where the two coordinate axes have the same scale and are orthogonal to each other. Then, the image picked up by the image sensor 50 will be converted into a image picked up by this normalization camera (normalized image). When converting into this normalized image, the internal parameters are used.

The X-axial focal distance is an internal parameter which represents an x-axis directional shift of the focal distance of the image sensor 50, and the Y-axial focal distance is an internal parameter which represents a y-axis directional shift of the focal distance of the image sensor 50. The X-axial principal point coordinate is an internal parameter which represents an x-axis directional shift of the principal point and the Y-axial principal point coordinate is an internal parameter which represents a y-axis directional shift of the principal point of the image sensor 50. The first coefficient of strain and the second coefficient of strain are internal parameters which represent strain due to the inclination of a lens of the image sensor 50.

An external parameter is used to indicate a condition (position and direction) of the image sensor 50 in which it is set up with respect to the world coordinate system. In other words, the external parameter indicates a shift of the three-dimensional coordinate system in the image sensor 50 (hereinafter referred to as a "camera coordinate system") with respect to the world coordinate system. In the present embodiment, the following six external parameters will be calculated: X-axial rotation vector, Y-axial rotation vector, Z-axial rotation vector, X-axial translational vector, Y-axial translational vector, and Z-axial translational vector. With these external parameters, the camera coordinate system of the image sensor 50 can be converted into the world coordinate system. The X-axial rotation vector represents a rotation of the camera coordinate system of the image sensor 50 around the x-axis, the Y-axial rotation vector represents a rotation of the camera coordinate system of the image sensor 50 around the y-axis, and the Z-axial rotation vector represents a rotation of the camera coordinate system of the image sensor 50 around the z-axis with respect to the world coordinate system. The X-axial rotation vector, the Y-axial rotation vector, and the Z-axial rotation vector are used to determine a conversion matrix which is to be converted from the world coordinate system into the camera coordinate system or vice versa. The X-axial translational vector represents an x-axial shift of the camera coordinate system, the Y-axial translational vector represents a y-axial shift of the camera coordinate system, and Z-axial translational vector represents a z-axial shift of the camera coordinate system with respect to the world coordinate system. The X-axial translational vector, the Y-axial translational vector, and the Z-axial translational vector are used to determine a translational vector which is to be converted from the world coordinate system into the camera coordinate system or vice versa.

For example, from the combination of the two-dimensional coordinates and three-dimensional coordinates of the feature points of the examples shown in FIGS. 5 and 7, respectively, the following parameters are calculated. As for the internal parameters, the X-axial focal distance=724.99418, the Y-axial focal distance=725.18331, the X-axial principal point coordinate=326.51234, the Y-axial principal point coordinate=246.694, the first coefficient of strain=0.2063882, and the second coefficient of strain=−0.6730771. As for the external parameters, the X-axial rotation vector=2.8974873, the Y-axial rotation vector=0.0234429, the Z-axial rotation vector=0.0165490, the X-axial translational vector =−1.5031760, the Y-axial translational vector=−2.3138816, and the Z-axial translational vector=102.9899989.

Subsequently, an internal parameter which is based on the picked-up image and stored in the internal comparison parameter storage area 633 is compared with an internal parameter which is stored in the internal parameter storage area 642 and currently being used to determine whether they match with each other. Further, an external parameter which is based on the picked-up image and stored in the external comparison parameter storage area 634 is compared with an external parameter which is stored in the external parameter storage area 643 and currently being used to determine whether they match with each other (S4). If they all match with each other, respectively (YES at S4), the image sensor 50 is not shifted in position, so that none of the parameters needs to be changed, thus ending the processing.

On the other hand, if any one of the parameter fails to match (NO at S4), the image sensor 50 may possibly have shifted in position. Therefore, the internal parameter stored in the internal comparison parameter storage area 633 is stored in the internal parameter storage area 642 and the external parameter stored in the external comparison parameter storage area 634 is stored to the external parameter storage area 643, thus correcting the parameters into new parameters (S5).

In such a manner, it is possible to extract two-dimensional coordinates in the camera coordinate system of the feature points 100 to 127 on the needle plate 80 with an image of this needle plate 80 picked up by the image sensor 50, correlate those coordinates with three-dimensional coordinates in the world coordinate system of the feature points 100 to 127 stored in the three-dimensional feature point coordinates storage area 641 of the EEPROM 64, and calculate at least one of an internal parameter and an external parameter by the sewing machine 1 itself. The parameters can thus be calculated using the member of the needle plate 80, which is originally equipped to the sewing machine 1. Therefore, the sewing machine 1 is capable of calculating the parameter easily without using any particular member. If the parameter is changed, it can be corrected by updating it to a new parameter. Accordingly, eve if the image sensor 50 has shifted in position, a parameter at the shifted position can be calculated and changed to such a parameter that suits the current position of the image sensor 50, thus using the correct parameter.

Next, an example of using parameters will be described below. The parameters are used when converting three-dimensional coordinates of a point in the world coordinate system into two-dimensional coordinates of the point in a picked-up image plane in the camera coordinate system, converting two-dimensional coordinates of a point in the picked-up image plane in the camera coordinate system into three-dimensional coordinates of a point in the world coordinate system, or processing an image picked up by the image sensor 50.

It is here assumed that point p in a picked-up image has two-dimensional coordinates (u, v) as well as three-dimensional coordinates $M_1(X_1, Y_1, Z_1)$ in the camera coordinate system. It is also assumed that point P obtained by converting point p into the world coordinate system has three-dimensional coordinates $M_w(X_w, Y_w, Z_w)$. As for the internal parameters, assume that the X-axial focal distance is fx, the Y-axial focal distance is fy, the X-axial principal point coordinate is cx, the Y-axial principal point coordinate is cy, the first coefficient of strain is $k_1$, and the second coefficient of strain is $k_2$. As for the external parameters, assume that the X-axial rotation vector is $r_1$, the Y-axial rotation vector is $r_2$, the Z-axial rotation vector is $r_3$, the X-axial translational vector is $t_1$, the Y-axial translational vector is $t_2$, and the Z-axial translational vector is $t_3$. Assume also that "$R_w$" is 3×3 rotation matrix which is determined based on the external parameters (X-axial rotation vector $r_1$, Y-axial rotation vector $r_2$, and Z-axial rotation vector $r_3$) and "$t_w$" is 3×1 translational vector which is determined based on the external parameters (X-axial translational vector $t_1$, Y-axial translational vector $t_2$, and Z-axial translational vector $t_3$).

First, processing will be described below which calculates the coordinates (u, v) of a point on a picked-up image plane in the camera coordinate system which the coordinates $M_w(X_w, Y_w, Z_w)$ of a point in the world coordinate system is projected onto. First, the coordinates $M_w(X_w, Y_w, Z_w)$ of a point in the world coordinate system are converted into the tree-dimensional coordinates $M_1(X_1, Y_1, Z_1)$ of a point in the camera coordinate system. They are calculated by "$M_1 = R_w \times M_w + t_w$". Subsequently, the calculated three-dimensional coordinates of the point in the camera coordinate system are converted into coordinates (x', y') in a normalized image in the camera coordinate system. These coordinates are calculated by "$x'=X_1/Z_1$" and "$y'=Y_1/Z_1$". Further, the first coefficient of strain $k_1$ and the second coefficient of strain $k_2$, which are internal parameters, are used to calculate coordinates (x", y") obtained by adding strain of the lens of the image sensor 50 to a normalization camera. These are calculated by "$x''=x' \times (1+k_1 \times r^2 + k_2 \times r^4)$" and "$y''=y' \times (1+k_1 \times r^2 + k_2 \times r^4)$". It should be noted that "$r^2 = x''^2 + y''^2$". Subsequently, the X-axial focal distance fx, the Y-axial focal distance fy, the X-axial principal point coordinate cx, and the Y-axial principal point coordinate cy, which are internal parameters, are added to the coordinates (x", y") obtained by adding the strain of the lens to the point in the normalized image to convert them into coordinates (u, v) in the picked-up image in the camera coordinate system. These coordinates are calculated by "$u = fx \times x'' + cx$" and "$v = fy \times y'' + cy$".

Next, processing will be described below which calculates the three-dimensional coordinates $M_w(X_w, Y_w, Z_w)$ of point P in the world coordinate system into which point p in an image picked up by the image sensor 50 is converted, from the coordinates (u, v) of this point p. By adding the X-axial focal distance fx, the Y-axial focal distance fy, the X-axial principal point coordinate cx, and the Y-axial principal point coordinate cy, which are internal parameters, the coordinates (u, v) of the point in the picked-up image in the camera coordinate system are converted into coordinates (x", y") in the normalized image in the camera coordinate system. These coordinates are calculated by "$x''=(u-cx)/fx$" and "$y''=(v-cy)/fy$". Subsequently, with the first coefficient of strain $k_1$ and the second coefficient of strain $k_2$, which are internal parameters, the strain of the lens is removed from the coordinates (x", y") to convert them into coordinates (x', y') in the normalized image. These coordinates are calculated by "$x'=x''-x'' \times (1+k_1 \times r^2 + k_2 \times r^4)$" and "$y'=y''-y'' \times (1+k_1 \times r^2 + k_2 \times r^4)$". Then, the coordinates in the normalized image in the camera coordinate system are converted into the three-dimensional coordinates $M_1(X_1, Y_1, Z_1)$ of the point in the camera coordinate system. It should be noted that $X_1$ and $Y_1$ have relationships of "$X_1 = x' \times Z_1$" and "$Y_1 = y' \times Z_1$", respectively. Also, the relationship of "$M_w = R_w^T (M_1 - t_w)$" is established between the three-dimensional coordinates $M_1(X_1, Y_1, Z_1)$ in the camera coordinate system and the three-dimensional coordinates $M_w(X_w, Y_w, Z_w)$ in the world coordinate system. It should be noted that $R_w^T$ is a transposed matrix of $R_w$. In this case, since the XY plane in the world coordinate system is set on the upper surface of the sewing machine bed 2, the simultaneous equations of "$X_1 = x' \times Z_1$", "$Y_1 = y' \times Z_1$", and "$M_w = R_w^T (M_1 - t_w)$"

are solved on the assumption that $Z_w=0$. In such a manner, $Z_1$ is calculated, $X_1$ and $Y_1$ are calculated, and $M_w(X_w, Y_w, Z_w)$ are calculated.

Next, processing will be described below which processes an image picked up by the image sensor 50. Here, processing will be described which process a picked-up image into an image (viewpoint-changed image) picked up from a different viewpoint (different camera position). The image sensor 50 is mounted to a position where it picks up an image of the needle plate 80 from above (see FIG. 2). In other words, its viewpoint is higher in height than the needle plate 80 (in the positive direction on the Z-axis). This viewpoint is changed, for example, to a diagonally upper right position of the needle plate 80, to process the picked-up image into a viewpoint-changed image obtained by imaging the needle plate 80 from this diagonally upper right position.

It is here assumed that the three-dimensional coordinates of a point in the world coordinate system are $M_w(X_w, Y_w, Z_w)$, the three-dimensional coordinates of a point in the camera coordinate system of the image sensor 50 are $M_1(X_1, Y_1, Z_1)$, and the three-dimensional coordinates of a point in a coordinate system (moved-viewpoint coordinate system) of the moved viewpoint are $M_2(X_2, Y_2, Z_2)$. It is also assumed that the two-dimensional coordinates of a point in a picked-up image plane in the camera coordinate system are $(u_1, v_1)$ and the two-dimensional coordinates of a point in a viewpoint-changed image plane in the moved-viewpoint coordinate system is $(u_2, v_2)$. "$R_w$" is 3×3 rotation matrix which is determined based on the X-axial rotation vector $r_1$, the Y-axial rotation vector $r_2$, and the Z-axial rotation vector $r_3$, which are external parameters and "$t_w$" is 3×1 translational vector which is determined based on the X-axial translational vector $t_1$, the Y-axial translational vector $t_2$, and the Z-axial translational vector $t_3$ which are an external parameter. In other words, $R_w$ and $t_w$ are utilized when converting the three-dimensional coordinates $M_w(X_w, Y_w, Z_w)$ in the world coordinate system into the three-dimensional coordinates $M_1(X_1, Y_1, Z_1)$ in the camera coordinate system. When converting the three-dimensional coordinates $M_w(X_w, Y_w, Z_w)$ in the world coordinate system into the three-dimensional coordinates $M_2(X_2, Y_2, Z_2)$ in the moved-viewpoint coordinate system, $R_{w2}$ (3×3 rotation matrix) and $t_{w2}$ (3×1 translational vector) are utilized. These determinants are determined based on which point in the world coordinate system the viewpoint of a destination corresponds to. A determinant that converts the three-dimensional coordinates $M_2(X_2, Y_2, Z_2)$ in the moved-viewpoint coordinate system into the three-dimensional coordinates $M_1(X_1, Y_1, Z_1)$ in the camera coordinate system are assumed to be $R_{21}$ (3×3 rotation matrix), $t_{21}$ (3×1 translational vector).

First, the determinant $R_{21}$, $t_{21}$ is calculated which converts the three-dimensional coordinates $M_2(X_2, Y_2, Z_2)$ in the moved-viewpoint coordinate system into the three-dimensional coordinates $M_1(X_1, Y_1, Z_1)$ in the camera coordinate system. The following relationships are established among $R_w$, $R_{w2}$, $R_{21}$, $t_w$, $t_{w2}$, and $t_{21}$: "$M_1=R_w \times M_w+t_w$ (conversion from the world coordinate system into the camera coordinate system)"; "$M_2=R_{w2} \times M_w+t_{w2}$ (conversion from the world coordinate system into the moved-viewpoint coordinate system)"; and "$M_1=R_{21} \times M_2+t_{21}$ (conversion from the moved-viewpoint coordinate system into the camera coordinate system)". Solving these in terms of $R_{21}$ and $t_{21}$ results in "$R_{21}=R_w \times R_{w2}^T$" and "$t_{21}=-R_w \times R_{w2}^T \times t_w$". Since $R_w$, $R_{w2}$, $t_w$, and $t_{w2}$ are fixed values that have already been calculated, $R_{21}$ and $t_{21}$ are determined uniquely.

Next, the process calculates two-dimensional coordinate $(u_1, v_1)$ which the two-dimensional coordinate $(u_2, v_2)$ of a point in the viewpoint-changed image correspond to. For this purpose, the two-dimensional coordinate $(u_2, v_2)$ of the point in the viewpoint-changed image are converted into two-dimensional coordinate $(x_2", y_2")$ in a normalized image in the moved-viewpoint coordinate system. It should be noted that "$x_2"=(u_2-cx)/fx$" and "$y_2"=(v_2-cy)/fy$". In this case, the X-axial focal distance fx, the Y-axial focal distance fy, the X-axial principal point coordinate cx, and the Y-axial principal point coordinate cy, which are internal parameters, are used. Subsequently, coordinates $(x_2', y_2')$ are calculated which are obtained by adding the strain of the lens to the two-dimensional coordinates $(x_2", y_2")$ in the normalized image. In this case, "$x_2'=x_2"-x_2" \times (1+k_1 \times r^2+k_2 \times r^4)$" and "$y_2'=y_2"-y_2" \times (1+k_1 \times r^2+k_2 \times r^4)$". It should be noted that "$r^2=x_2'^2+y_2'^2$". In this case, the first coefficient of strain $k_1$ and the second coefficient of strain $k_2$, which are internal parameters, are used.

Subsequently, three-dimensional coordinates $M_2(X_2, Y_2, Z_2)$ in the moved-viewpoint coordinate system are calculated from the two-dimensional coordinates $(x_2', y_2')$ in the normalized image in the moved-viewpoint coordinate system. In this case, "$X_2=x_2' \times Z_2$" and "$Y_2=y_2' \times Z_2$". Further, since the upper surface of the sewing machine bed 2 is set as the XY plane in the world coordinate system, $Z_w=0$ is set in "$M_2=R_{w2} \times M_w+t_{w2}$". Then, by solving the simultaneous equations, the three-dimensional coordinates $M_2(X_2, Y_2, Z_2)$ in the moved-viewpoint coordinate system are calculated.

Then, the three-dimensional coordinates $M_2(X_2, Y_2, Z_2)$ in the moved-viewpoint coordinate system are converted into three-dimensional coordinates $M_1(X_1, Y_1, Z_1)$ in the camera coordinate system. In this case, $M_2(X_2, Y_2, Z_2)$ are substituted into the equation of "$M_1=R_{21} \times M_2+t_{21}$", to calculate $M_1(X_1, Y_1, Z_1)$. Subsequently, the three-dimensional coordinates $M_1(X_1, Y_1, Z_1)$ in the camera coordinate system are converted into two-dimensional coordinates $(x_1', y_1')$ in the normalized image in the camera coordinate system. In this case, "$x_1'=x_1/z_1$" and "$y_1'=y_1/z_1$". Further, two-dimensional coordinates $(x_1", y_1")$ are calculated to which the strain of the lens is added. In this case, "$x_1"=x_1' \times (1+k_1 \times r^2+k_2 \times r^4)$" and "$y_1"=y_1' \times (1+k_1 \times r^2+k_2 \times r^4)$" are used in this calculation. It should be noted that "$r^2=x_1'^2+y_1'^2$". Subsequently, the two-dimensional coordinates $(x_1", y_1")$ in the normalized image are converted into two-dimensional coordinates $(u_1, v_1)$ in the image coordinates. These coordinates are calculated by "$u_1=fx \times x_1"+cx$" and "$v_1=fy \times y_1"+cy$".

By performing such processing on all of the pixels of a viewpoint-changed image, the corresponding relationship between the pixel $(u_1, v_1)$ of a picked-up image and the pixel $(u_2, v_2)$ of a viewpoint-changed image is known, so that the viewpoint-changed image can be created from the picked-up image.

In such a manner, with parameters calculated in the sewing machine 1, the three-dimensional coordinates of a point in the world coordinate system can be converted into the two-dimensional coordinates of a point in the picked-up image plane in the camera coordinate system. It is thus possible to acquire the coordinates in the two-dimensional coordinate system of a point represented in the three-dimensional coordinates by taking into account the peculiar properties and setup conditions of the image sensor 50.

Further, with parameters calculated in the sewing machine 1, the three-dimensional coordinates of a point in the picked-up image plane in the camera coordinate system can be converted into the three-dimensional coordinates of a point in the world coordinate system. It is thus possible to grasp a point in a picked-up image as a real point in the three-dimensional coordinate system in a condition which the effects of the peculiar properties and setup conditions of the image sensor 50 are eliminated from, thereby grasping the positional relationship of a real point in the three-dimensional coordinate system and acquiring a distance between two points.

Further, with parameters calculated in the sewing machine 1, it is possible, for example, to process an image picked up by the image sensor 50. It is thus possible to obtain an image in which real points in the three-dimensional coordinate system are accurately projected onto the two-dimensional coordinates in a condition which the effects of the peculiar properties and setup conditions of the image sensor 50 are eliminated from.

It should be noted that the sewing machine 1 according to the present embodiment has employed a small-sized and inexpensive CMOS sensor as the image pickup device, thereby making it possible to downsize a space in which the image pickup device is set up in the sewing machine and to reduce the costs of the photographing device.

Further, in the sewing machine 1 according to the present embodiment, feature points have been set to holes or punch marks formed in the needle plate 80 that is originally equipped to the sewing machine 1, thus enabling calculating parameters therefrom. Therefore, any other feature points need not be set to calculate the parameter, so that the user as well as the manufacturer of the sewing machine 1 can easily calculate the parameters and detect a shift in location where the image sensor 50 is set up. Thus, even when the user is using the sewing machine 1, it is possible to acquire accurate position information from an image picked up by the image sensor 50, thereby properly carrying out processing that uses the position information acquired from the image.

Figure 11:
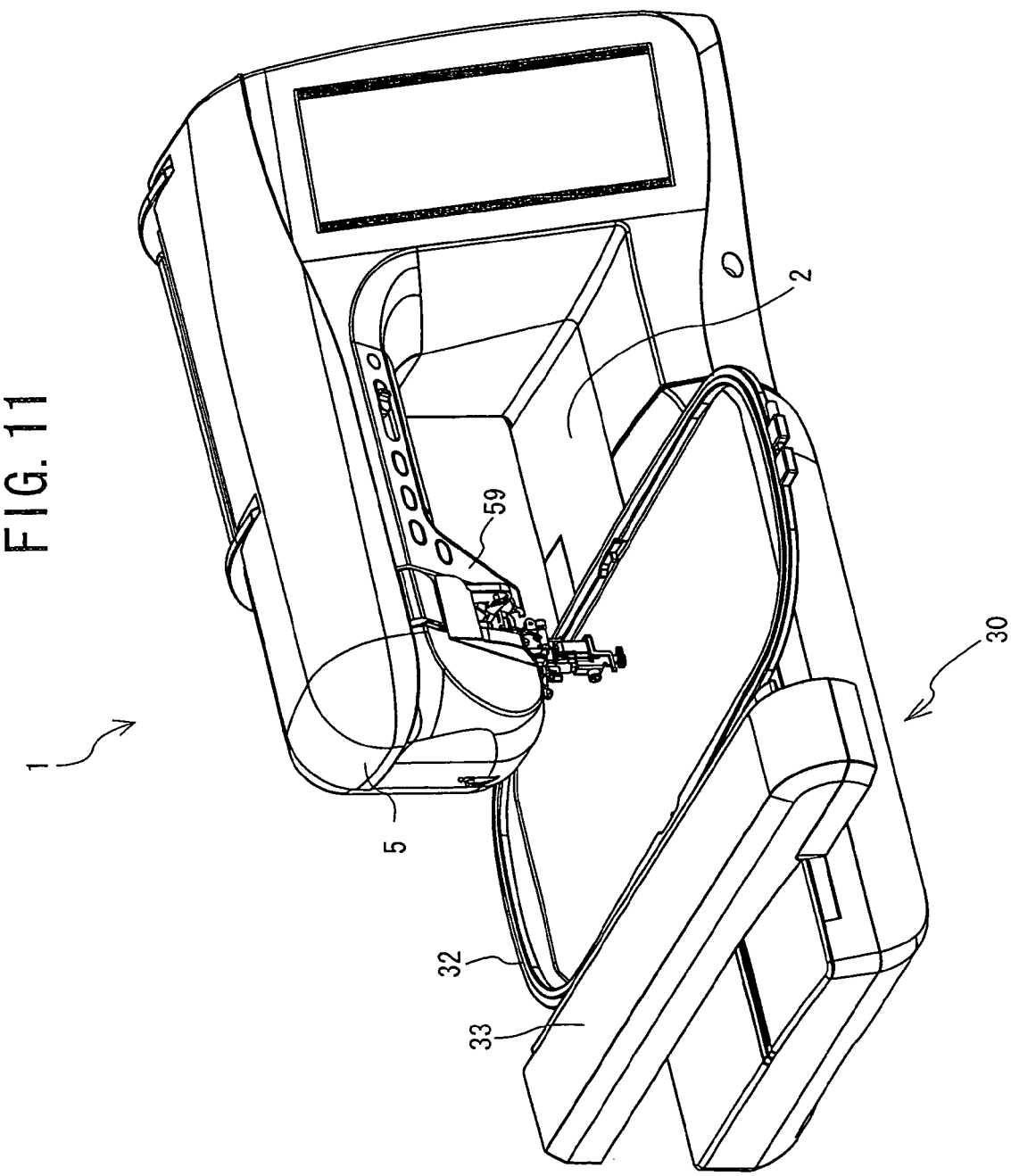
FIG. 11 is a perspective view of the sewing machine equipped with an embroidery apparatus as viewed from the top.

The sewing machine according to the present disclosure is not limited to the above embodiment and of course can be changed variously without departing from the gist of the present disclosure. Although the above embodiment has set the feature points 100 to 127 on the needle plate 80 to calculate parameters, the positions and the number of the feature points are not limited to them. Although the above embodiment has set only an intersection between straight lines as a feature point, it may be possible to calculate coordinates of the center of a circle by Hough transform and set a feature point to that center of the circle. The circles may be, for example, the holes 81 to 85. Further, even in the case of using the intersection between straight lines, the holes are not limited in shape to a rectangle but may be a vertex of a pentagon or a hexagon. Further, the feature points need not be set on the needle plate 80. For example, the feature points may be set on an embroidery frame 32 of a sewing machine as far as the sewing machine can be equipped with the embroidery apparatus 30 as shown in FIG. 11.

A case where feature points are set on the embroidery frame 32 will be described below with reference to FIGS. 11 to 14. First, the embroidery apparatus 30 will be described. As shown in FIG. 11, the embroidery apparatus 30 is mounted after the side table 8 is detached from the sewing machine bed 2 of the sewing machine 1. In this condition, the embroidery apparatus 30 is electrically connected to the sewing machine 1. The embroidery apparatus 30 is mounted thereon with a carriage cover 33 which extends in the front-and-rear direction. Inside the carriage cover 33, a front-and-rear movement mechanism (not shown) is fitted which moves in the front-and-rear direction a carriage (not shown) to which the embroidery frame 32 is attached detachably. To the right of the carriage, a mounting portion (not shown) is fitted to mount the embroidery frame 32. This mounting portion is disposed in such a manner as to project rightward from the right side surface of the carriage cover 33. To this mounting portion, a guide (which corresponds to a guide 251 in FIG. 12) is mounted on the left side of the embroidery frame 32. The carriage, the front-and-rear movement mechanism, and the carriage cover 33 are driven by a right-and-left movement mechanism (not shown) equipped within the body of the embroidery apparatus 30 in such a manner that they may move in the right-and-left direction. By this configuration, the embroidery frame 32 is driven so as to move in the right-and-left direction. These front-and-rear movement mechanism and right-and-left movement mechanism are driven by a Y-axis motor (not shown) and an X-axis motor (not shown), respectively. By outputting a drive instruction to the Y-axis and X-axis motors from the CPU 61 in the sewing machine 1, the embroidery frame 32 can be moved in the front-and-rear and right-and-left directions. It should be noted that the size of the embroidery frame 32 is not limited to that shown in FIG. 11 but may be various ones such as that of an embroidery frame 250 shown in FIG. 12, which is smaller than the embroidery frame 32.

Figure 12:
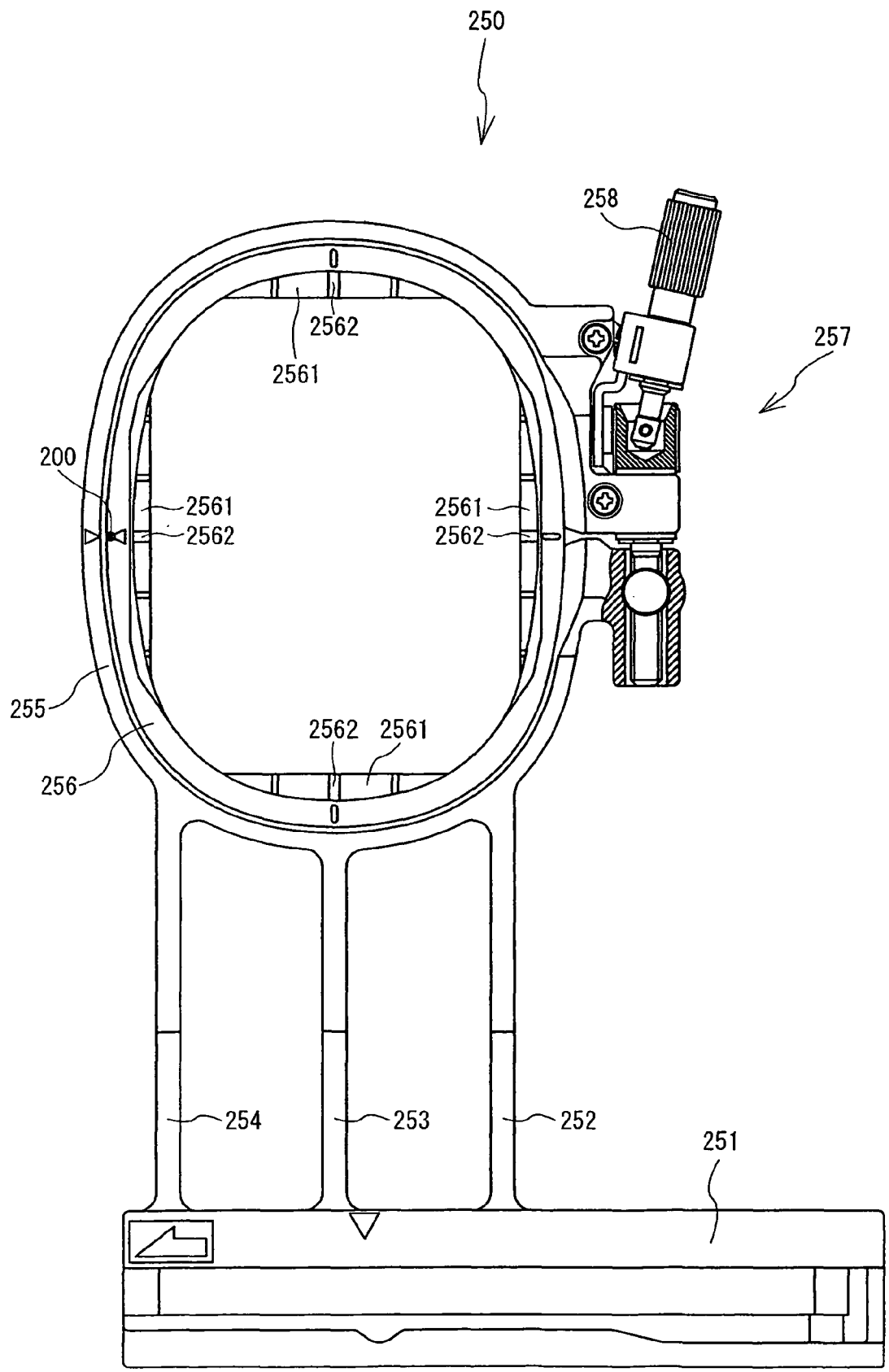
FIG. 12 is a plan view of an embroidery frame smaller than that shown in FIG. 11.
Figure 13:
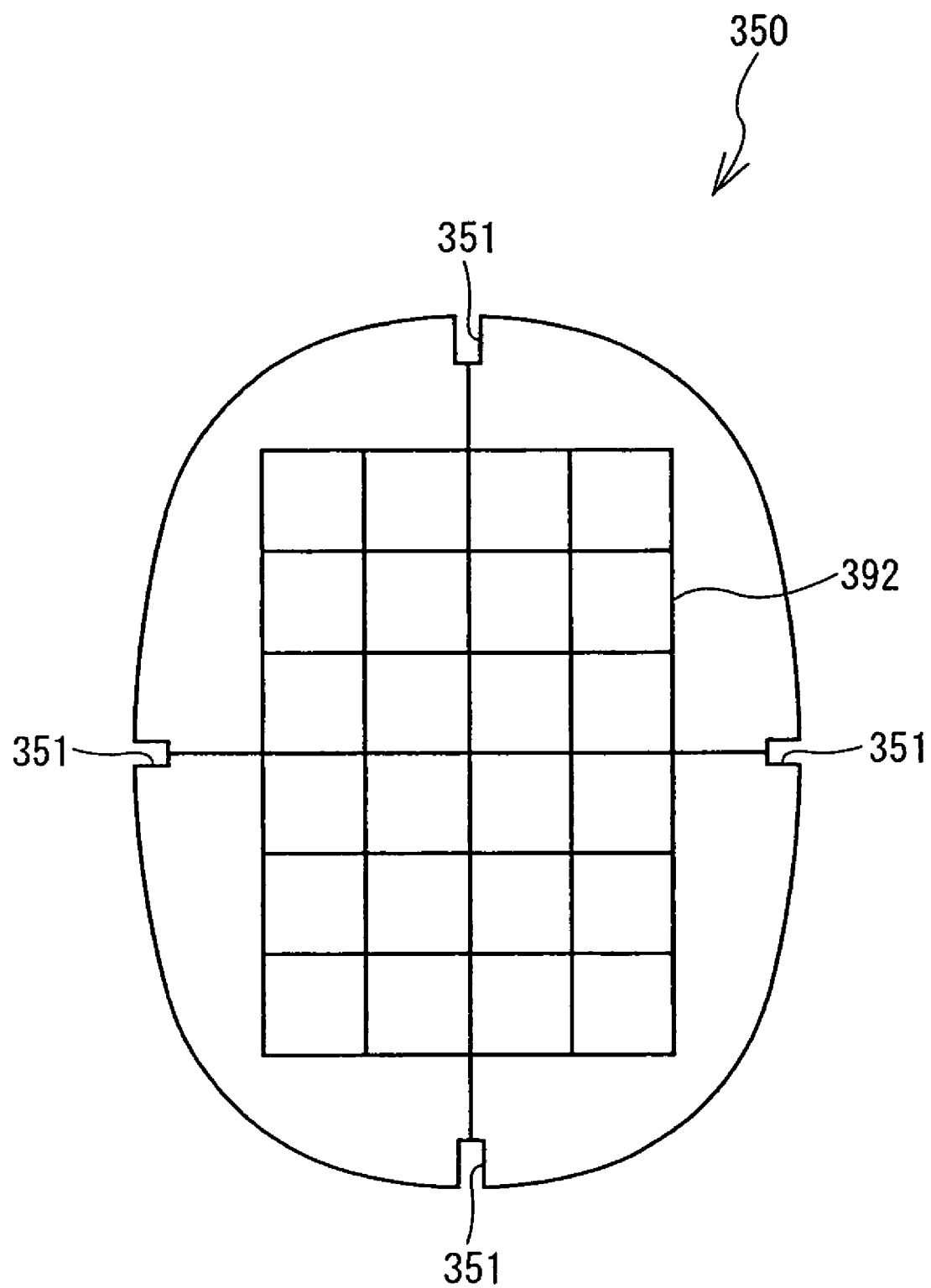
FIG. 13 is a plan view of a template placed on the embroidery frame.

Now, the embroidery frame 250 will be described below with reference to FIG. 12. The embroidery frame 250 is mainly constituted of a guide 251, support bars 252 to 254, an outer frame 255, an inner frame 256, and an adjustment mechanism 257. From the guide 251 which is substantially rectangular in plane view, the support bars 252 to 254 which support the outer frame 255 which is roughly elliptical in plane view is extended. At the substantially middle position of the lower surface of the guide 251, a projection portion (not shown) is provided which extends in the longitudinal direction. By engaging this projection portion into an engagement groove (not shown) which is formed in the carriage of the embroidery apparatus 30 in such a manner as to extend in the front-and-rear direction, the embroidery frame 250 is mounted to the carriage. In a condition where that frame is mounted, the projection portion is urged by an elastic urging spring (not shown) fitted to the carriage in such a direction as to be pressed toward the engagement groove, so that the embroidery frame 250 is securely engaged with the carriage without rattling movements so that the embroidery frame 250 and the carriage may move integrally. Inside the outer frame 255, the inner frame 256 is fitted whose outer peripheral shape is substantially the same as the inner peripheral shape of the outer frame 255. Work cloth is sandwiched between the outer frame 255 and the inner frame 256 and then held on the embroidery frame 250 when the adjustment screw 258 of the adjustment mechanism 257 on the outer frame 255 is tightened. At four positions on the lower end portion of the inner periphery of the inner frame 256, a reinforcement rib 2561 is provided. The height of the reinforcement rib 2561 is about one fourth of that of the inner frame 256. On the reinforcement ribs 2561, a template 350 (see FIG. 13) is placed which is formed slightly smaller than the inner peripheral shape of the inner frame 256. At the substantially middle position of the reinforcement ribs 2561, an engaging projection portion 2562 is provided which is engaged with a notched portion 351 for positioning of the template 350. When the engaging projection portion 2562 is engaged with the notched portion 351, a position on the inner frame 256 will be determined at which the template 350 is to be placed. The template 350 is a sheet made of a transparent resin, on the surface of which a plurality of base lines 392 are printed in a grid as shown in FIG. 13. When sandwiching work cloth between the outer frame 255 and the inner frame 256, the user will attach the work cloth to the embroidery frame 250 as aligning a specific portion of the baseline 392 with a mark provided on the work cloth with a chalk pencil etc. (not shown) beforehand. It is thus possible prepare for sewing a desired embroidery pattern at a desired position on the work cloth.

Figure 14:
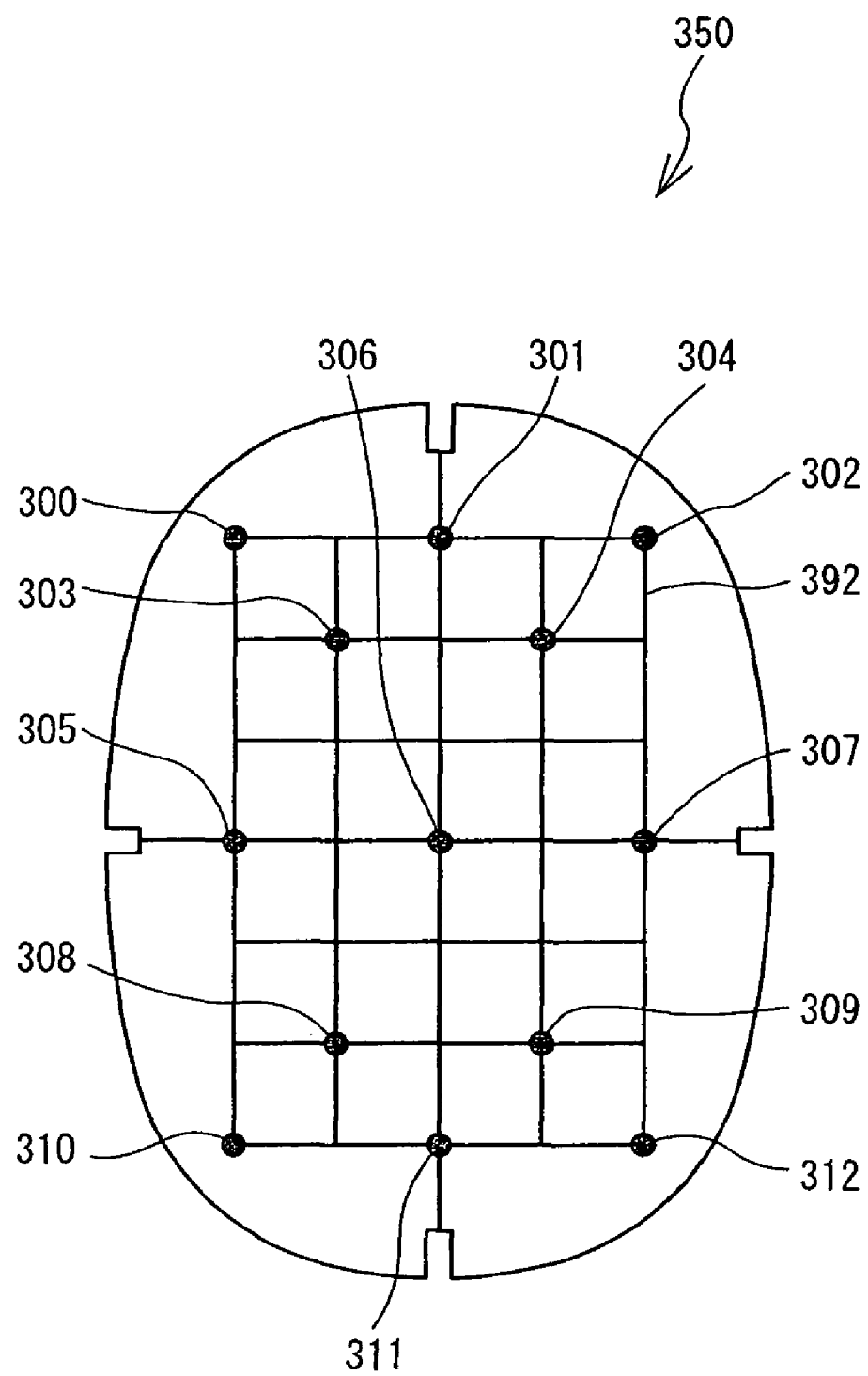
FIG. 14 is a plan view of the template shown in FIG. 13.

Now, one example will be described below regarding feature points using an embroidery frame. As shown in FIG. 14, feature points 300 to 312 are disposed on the template 350. Then, three-dimensional coordinates of the feature points 300 to 312 at the time when the embroidery frame 250 has been moved to a predetermined position are stored in the three-dimensional feature point coordinates storage area 641 in the EEPROM 64 beforehand. Further, instructions (of movement distances) which are issued to the X-axis and Y-axis motors to move the embroidery frame 250 to the predetermined position are also stored in the EEPROM 64 already. Then, according to the parameter calculation program, when an image is being acquired at S1, the embroidery frame 250 is moved to the predetermined position so that the image is picked up by the image sensor 50. The following steps of feature point extraction (S2) and parameter calculation (S3) are the same as those of the above embodiment. It should be noted that the feature points may be disposed on the embroidery frame 250 instead of the template 350.

Next, a modification will be described below regarding feature points using an embroidery frame. One feature point is disposed on the embroidery frame 250. In an example shown in FIG. 12, a feature point 200 is disposed at the vertex of one of triangular marks provided on the upper surface of the inner frame 256. The triangular mark is used as a standard for aligning with the outer frame 255. If straight lines are extracted from a picked-up image containing the triangular mark, the sides of the triangular mark are extracted as straight lines, thus enabling calculation of coordinates of the vertex of the triangle formed by an intersection between the straight lines. Then, three-dimensional coordinates of the feature point 200 at the time when the embroidery frame 250 has been moved to a plurality of predetermined positions are stored in the three-dimensional feature point coordinates storage area 641 in the EEPROM 64 beforehand. As Shown in FIG. 15, instructions (of movement distances) which are issued to the X-axis and Y-axis motors to move the embroidery frame 250 to the predetermined positions are also correlated with three-dimensional coordinates and stored already in the EEPROM 64 in the case of this modification. In other words, even with the only one feature point 200 disposed, the position of the feature point 200 is moved by moving the embroidery frame 250. Therefore, if there are 10 destinations of the embroidery frame 250, the feature point 200 also has 10 positions, which will be the same as 10 feature points being disposed.

Then, according to the parameter calculation program, an image of the embroidery frame 250 moved to the first predetermined position is picked up by the image sensor 50, which image the feature point 200 is extracted from. Next, an image of the embroidery frame 250 moved to the second predetermined position is picked up by the image sensor 50, which image the feature point 200 is extracted from. This processing to move the embroidery frame 250, pick up the image, and extract the feature point 200 will be repeated until two-dimensional coordinates of the feature point 200 at all of the predetermined positions are calculated. After that, parameters are calculated based on the two-dimensional coordinates of the feature point 200 at all of the predetermined positions and the three-dimensional coordinates stored in the three-dimensional feature point coordinates storage area 641.

It should be noted that in the case of thus obtaining feature points by moving the embroidery frame 250, the number of the feature points to be provided on the embroidery frame is not limited to one. For example, when obtaining 30 feature points finally, the embroidery frame 250 on which three feature points are provided may be moved to 10 positions to acquire its image at each of those positions, thereby extracting a total of 30 feature points.

In the above sewing machine 1, the parameters can be calculated by using the embroidery frame 250 or the template 350 which is originally equipped to this sewing machine, so that any other feature points need not be set to calculate the parameters. Therefore, the user as well as the manufacturer of the sewing machine 1 can easily calculate the parameters and detect a shift in location where the image sensor 50 is set up. Thus, even when the user is using the sewing machine 1, it is possible to acquire accurate position information from an image picked up by the image sensor 50, thereby properly carrying out processing that uses the position information acquired from the image.

Further, a feature point may be a point on the embroidery frame 250 or the template 350 in a condition where the embroidery frame 250 is moved and disposed at a predetermined position. Therefore, for example, even in a case where there is one point on the embroidery frame 250 or the template 350, if there are five predetermined positions, it can be assumed that there are five feature points.

Although the above embodiment has calculated both of the internal and external parameters, only the internal parameters calculated by the sewing machine manufacturer may be stored in the ROM 62 or the EEPROM 64 before the shipment of the sewing machine 1 so that only the external parameters might be calculated with the sewing machine 1.

The above embodiment has used a comparison image parameter calculated at S3 as "comparison information" and a parameter currently being used as "parameter information". In other words, the parameter has been compared with the parameter. However, things other than the parameters may be used as the "comparison information" and the "parameter information". For example, the two-dimensional coordinates of a feature point and an image may be used as the "comparison information" and the "parameter information". In other words, the coordinates of a feature point extracted from an image (comparison image) picked up at S1 may be used as the "comparison information". Also, the two-dimensional coordinates of a feature point used to calculate a parameter currently being used may be used as the "parameter information". In this case, the two-dimensional coordinates of the feature point at the time when the parameter currently being used was calculated is stored in the EEPROM 64. Further, as the "comparison information", a comparison image may be used to be compared with an image, as the "parameter information", which was used when the parameter currently being used was calculated. In this case, an image used when the image currently being used was calculated is stored in the EEPROM 64. It should be noted that to compare the images, for example, a known technique referred to as block matching may be used. This technique enables detecting a difference (shift) between two images as a vector. If the calculated shift (vector) has some length, the two images should be different from each other. In the case of using the two-dimensional coordinates of feature points, if it is determined that the comparison information and the parameter information do not match, the two-dimensional coordinates of the feature points are used to calculate a new parameter. Further, in the case of using images, if it is determined that the comparison information and the parameter information do not match, the feature points are extracted from the comparison image to calculate a new parameter.

In the above embodiment, determination is made as to whether the image sensor 50 is shifted in location, at a timing instructed by a user or a predetermined timing (for example, upon power application, when sewing is ended, or in accordance with a cumulative number of stitches). Then, if it is necessary to change the parameters (NO at S4), the parameters have been corrected immediately. However, if the image sensor 50 is shifted in location before the correction of the parameters, only notification may be made to the effect. In this case, at S5 of the flowchart shown in FIG. 10, rather than correction of the parameters, a message may be displayed on the LCD 10 or an alarm sound may be output. Further, after the notification, the user may be prompted to select whether to correct the parameters.

As described above, in the sewing machine 1, an image on the sewing machine bed 2 can be picked up, to obtain at least one of an internal parameter and an external parameter of the image sensor 50 equipped to the sewing machine 1. Therefore, the parameters can be calculated by the sewing machine itself without requiring any other apparatus. Further, an image (basic image) which is stored in the EEPROM 64 and picked up when a parameter currently being used was calculated and the current image (comparison image) can be compared, coordinates of a feature point at the time when the parameter currently used was calculated and those of a feature point in the current image (comparison image) can be compared, or the parameter currently being used and the parameter calculated from the current image (comparison image) can be compared with determine whether they match with each other, thereby determining whether the image sensor 50 has shifted from its setup position at the time when the parameter currently used was calculated, that is, whether the parameter currently used needs to be corrected. If it is determined that the image sensor 50 has shifted in position, the user can be notified that the parameter needs to be re-calculated. It is thus possible to prevent the user from continuously using the image sensor 50 without knowing that the parameter currently being used is not appropriate because the setup position of the image sensor 50 has shifted from that at the time when the parameter was calculated. It is further possible to prompt the user to correct the parameter. Therefore, by correcting the parameter, the user can acquire accurate position information from an image picked up by the image sensor 50. It is then possible to properly perform the processing that uses the position information (coordinates) acquired from the image.

Further, if it is determined that the image sensor 50 has shifted from its setup position at the time when the parameter currently being used was calculated, it is also possible to re-calculate the parameter at the current setup position of the image sensor 50 and store it in the EEPROM 64. Accordingly, even if the setup position of the image sensor 50 has shifted due to the vibrations caused by sewing operations of the sewing machine 1 or the user's touch on the image sensor 50, the sewing machine itself can re-calculate and correct the parameter that is suitable for the current setup position of the image sensor 50. It is thus possible to acquire accurate position information from an image picked up by the image sensor 50.

The above embodiment has performed the parameter correction processing comprising the determination as to shift in position of the image sensor 50, based on an execution instruction by the user. However, in a modification, whether the image sensor 50 has shifted in position may be determined during sewing as needed. As a result, if it is determined that the image sensor 50 has shifted in position, the user may be notified of it. Now, processing will be described below of determining as to a possible shift in position of the image sensor 50 during sewing with reference to FIG. 16. This processing starts when sewing is started in response to pressing of the sewing start-and-stop switch 41 by the user. In other words, the processing is executed by the CPU 61 during sewing. In this modification, an image is acquired each time the embroidery frame 32 is moved. It is here assumed that an earlier acquired image is referred to as a "first image" and a later acquired one is referred to as a "second image". The RAM 63 includes a first image storage area (not shown) and a second image storage area (not shown). The first image storage area stores first images and the second image storage area stores second images. Then, the first and the second images are compared, to calculate a movement distance of the embroidery frame 32. This movement distance of the embroidery frame 32 is also calculated from embroidery data. Then, the movement distance (hereinafter referred to as a "image movement distance") calculated from the images is compared with the movement distance (hereinafter referred to as a "embroidery data movement distance") calculated from the embroidery data, and if they do not match, it is determined that the image sensor 50 has shifted in position, so that an alarm message will be output to the LCD 10.

First, it is determined whether the sewing start-and-stop switch 41 is pressed to end sewing (S11). If it is not instructed to end sewing (NO at S11), the process determines whether movement of the embroidery frame 32 is completed (S12). If the movement of the embroidery frame 32 is completed (YES at S12), an image is picked up by the image sensor 50 (S13). If, then, no image is stored in the second image storage area (NO at S14) and no image is stored in the first image storage area either (NO at S15), the image picked up at S13 is considered to be a first image and, therefore, stored in the first image storage area as the first image (S16). Then, the process returns to S11.

Then, if it is not instructed to end sewing (NO at S11), the process waits until the next movement of the embroidery frame 32 is completed (NO at S12, NO at S11). If the next movement of the embroidery frame 32 is completed (YES at S12), a new image is picked up by the image sensor 50 (S13). In this case, no second image is stored (NO at S14) but the first image is stored at S16 (YES at S15). Therefore, the image picked up at S13 most recently is stored in the second image storage area as the second image (S17). Then, the process returns to S11, and if it is not instructed to end sewing (NO at S11), the process waits until the next movement of the embroidery frame 32 is completed (NO at S12, NO at S11). If the next movement of the embroidery frame 32 is completed (YES at S12), a new image is picked up by the image sensor 50 (S13). Then, the process goes to S14.

Since the second image has been stored at S16 (YES at S14), the process goes to S18. The image stored in the second image storage area is stored in the first image storage area as a first image (S18); and the image acquired at S13 is stored in the second image storage area as a second image (S19). Then, the process calculates movement distances of the first image and the second image (S20). The movement distances may be calculated using the known method referred to as block matching. This method enables detecting a difference between two images as a vector. In this case, the camera coordinate system of the image sensor 50 is employed, so that a calculated vector is a two-dimensional image in the image plane in the camera coordinate system. A detected movement distance (vector) is converted into three-dimensional coordinates in the world coordinate system (S21). In this case, it is assumed that the coordinates indicating a movement direction are represented by $(u_m, v_m)$ and the three-dimensional coordinates obtained by converting these coordinates into the world coordinate system are represented by $M_{wm}(X_{wm}, Y_{wm}, Z_{wm})$. First, the X-axial focal distance fx, the Y-axial focal distance fy, the X-axial principal point coordinate cx, and the Y-axial principal point coordinate cy, which are internal parameters, are added to the coordinates $(u_m, v_m)$ of a point in a picked-up image in the camera coordinate system to convert these into coordinates (x", y") in a normalized image in the camera coordinate system. These coordinates are calculated by "x"=$(u_m-cx)/fx$" and "y"=$(v_m-cy)/fy$". Subsequently, by the first coefficient of strain $k_1$ and the second coefficient of strain $k_2$, which are internal parameters, the strain of the lens is removed from the coordinates (x", y") to give converted coordinates (x', y') in the normalized image. These coordinates are calculated by "x'=x"−x"×$(1+k_1 \times r^2 + k_2 \times r^4)$" and "y'=y"×y"×$(1+k_1 \times r^2 + k_2 \times r^4)$". Then, the coordinates in the normalized image in the camera coordinate system are converted into the three-dimensional coordinates $M_m(X_m, Y_m, Z_m)$ of the point in the camera coordinate system. It should be noted that $X_m$ and $Y_m$ have relationships of "$X_m$=x'×$Z_m$" and "$Y_m$=y'×$Z_m$", respectively. The relationship of "$M_{wm}=R_{wm}^T (M_1 - t_{wm})$" is established between the three-dimensional coordinates $M_m(X_m, Y_m, Z_m)$ in the camera coordinate system and the three-dimensional coordinates $M_{wm}(X_{wm}, Y_{wm}, Z_{wm})$ in the world coordinate system. $R_{wm}^T$ is a transposed matrix of $R_{wm}$. The XY plane in the world coordinate system is set on the upper surface of the sewing machine bed 2, so that $Z_w=0$ is assumed. By solving the simultaneous equations of "$X_m$=x'×$Z_m$", "$Y_m$=y'×$Z_m$", and "$M_{wm}=R_{wm}^T(M_m - t_{wm})$", $Z_m$ is calculated, $X_m$ and $Y_m$ are calculated, and $M_{wm}(X_{wm}, Y_{wm}, Z_{wm})$ are calculated.

Subsequently, a distance (embroidery data movement distance) by which the embroidery frame 23 has been moved from a point in time when the first image was picked up to a point in time when the second image was picked up is calculated from the embroidery data storage area 181 of the memory card 18 (S22). As described above, for the embroidery frame 32, the coordinates of a needle drop point are written in three-dimensional coordinates in the world coordinate system. The three-dimensional coordinates of the subsequent needle drop point with respect to the previous needle drop point are assumed to be an embroidery data movement distance. The process determines whether the image movement distance calculated at S21 matches with the embroidery data movement distance calculated at S22 (S23). If they match (YES at S23), it is determined that the image sensor 50 has not shifted in position. Then, the process returns to S11, to repeat the processing from S12 to S23 until receiving an instruction to end sewing. It should be noted that these two movement distances need not necessarily be completely identical but it may be determined that they match if a difference between the two falls within a predetermined percentage (for example, 5%) of the movement distance of the image (or the embroidery frame 32). On the other hand, if it is determined that they do not match (NO at S23), an alarm message is displayed on the LCD 10 (S24). The message will prompt the user to re-calculate the parameters, saying, for example, "The image sensor is shifted. Re-calculate the parameter. When doing so, detach the embroidery frame so that the image sensor can photograph the needle plate". It should be noted that if the sewing machine 1 is equipped with a speaker, an alarm sound may be output or a message may be output as a speech. Further, the sewing machine 1 may be equipped with an alarm lamp to turn it on or blink it, thereby notifying that it is necessary to re-calculate the parameter. Then, the process returns to S11, to repeat the processing from S12 to S24 until receiving an instruction to end sewing (YES at S11).

In such a manner, as needed during sewing, a determination may be made as to whether the image sensor 50 is shifted in position. It should be noted that although this modification has compared an image movement distance and an embroidery data movement distance for each stitch, the comparison timing may not be each stitch. For example, the movement distances may be compared every five stitches or every ten stitches, or for each predetermined lapse of time, for example, one second. However, since the first image needs to be contained partially in the second image in order to compare the first and second images, it is necessary to employ an appropriate timing based on a pickup range of the image sensor 50, a sewing speed, and a stitch length.

Further, the above embodiment has converted the movement distance of an image into three-dimensional coordinate in the world coordinate system. However, the embroidery data movement distance may be converted into two-dimensional coordinates in the camera coordinate system, instead of adapting a image movement distance to an embroidery data movement distance. In this case, it is assumed that the three-dimensional coordinates indicating an embroidery data movement distance are represented by $M_{ws}(X_{ws}, Y_{ws}, Z_{ws})$ and the two-dimensional coordinates obtained by converting these coordinates into the picked-up image plane in the camera coordinate system are represented by $(u_s, v_s)$. First, the coordinates $M_{ws}(X_{ws}, Y_{ws}, Z_{ws})$ of a point in the world coordinate system are converted into three-dimensional coordinates $M_{1s}(X_{1s}, Y_{1s}, Z_{1s})$ of a pint in the camera coordinate system. These coordinates are calculated by "$M_{1s}=R_{ws} \times M_{ws}+t$". Subsequently, the calculated three-dimensional coordinates in the camera coordinate system are converted into coordinates (x', y') in the normalized image in the camera coordinate system. These coordinates are calculated by "x'=$X_{1s}/Z_{1s}$" and "y'=$Y_{1s}/Z_{1s}$". Further, the first coefficient of strain $k_1$ and the second coefficient of strain $k_2$, which are internal parameters, are used to calculate coordinates (x", y") obtained by adding the strain of the lens of the image sensor 50 to the normalization camera. These are calculated by "x"=x'×$(1+k_1 \times r^2 + k_2 \times r^4)$" and "y"=y'×$(1+k_1 \times r^2 + k_2 \times r^4)$". It should be noted that "$r^2 = x''^2 + y''^2$". Subsequently, the X-axial focal distance fx, the Y-axial focal distance fy, the X-axial principal point coordinate cx, and the Y-axial principal point coordinate cy, which are internal parameters, are added to the coordinates (x", y") obtained by adding the strain of the lens to the point in the normalized image to convert these into coordinates $(u_s, v_s)$ in the picked-up image in the camera coordinate system. These coordinates are calculated by "$u_s$=fx×x"+cx" and "$v_s$=fy×y"+cy".

As in the case of the modification described with reference to the flowchart of FIG. 16, besides notification of a shift in the image sensor 50, the parameters may be corrected automatically at predetermined timings. For example, if the image sensor 50 has shifted in position, the parameters may be corrected when replacing a thread spool (not shown) in order to replace the color during embroidery sewing (see FIG. 18), when replacing a bobbin because a bobbin thread is exhausted during sewing (see FIG. 19), when ending sewing, or when starting sewing or the like.

Figure 16:
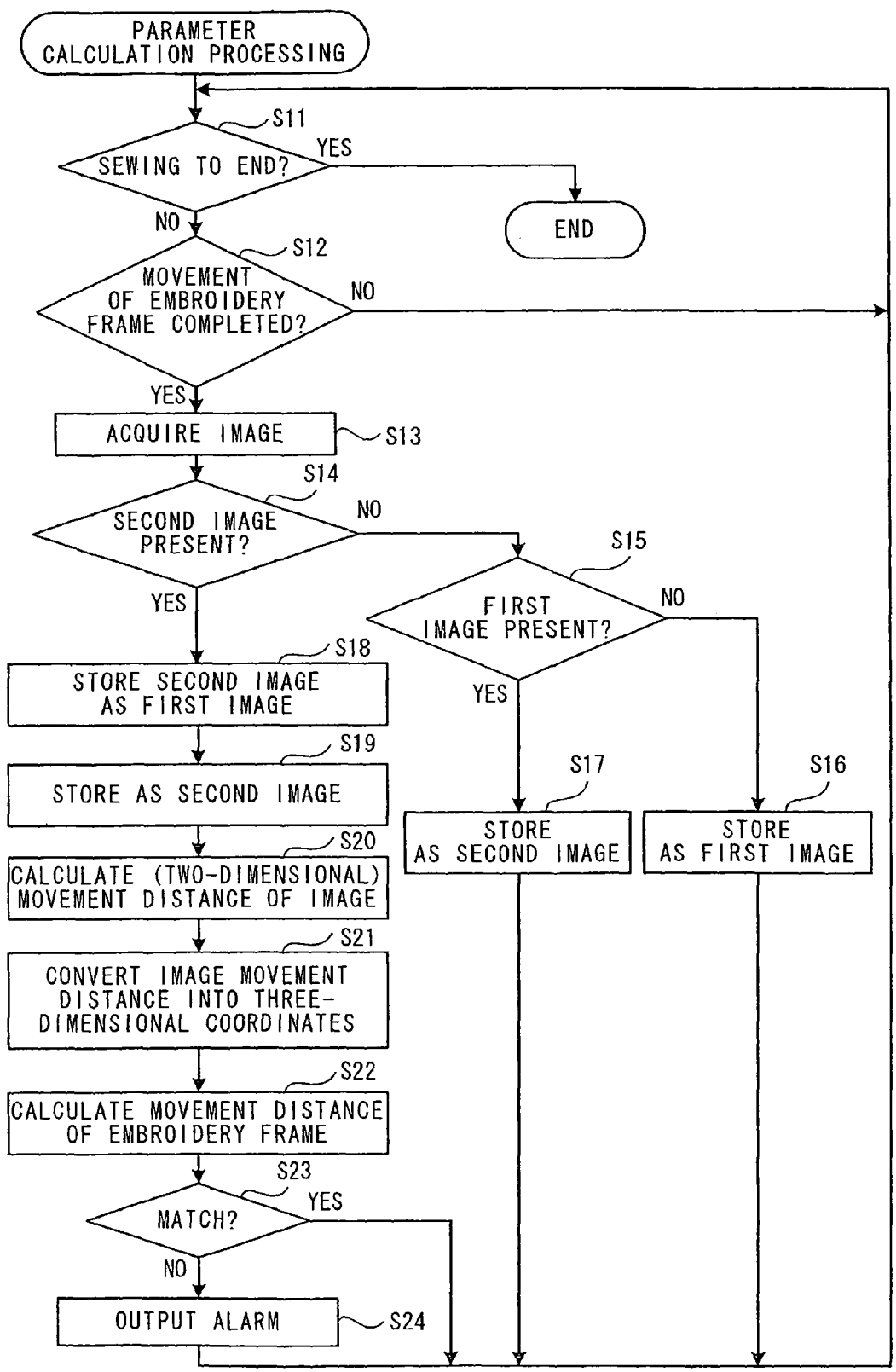
FIG. 16 is a flowchart of processing in the case of determination as to a shift in location of the image sensor during sewing.
Figure 17:
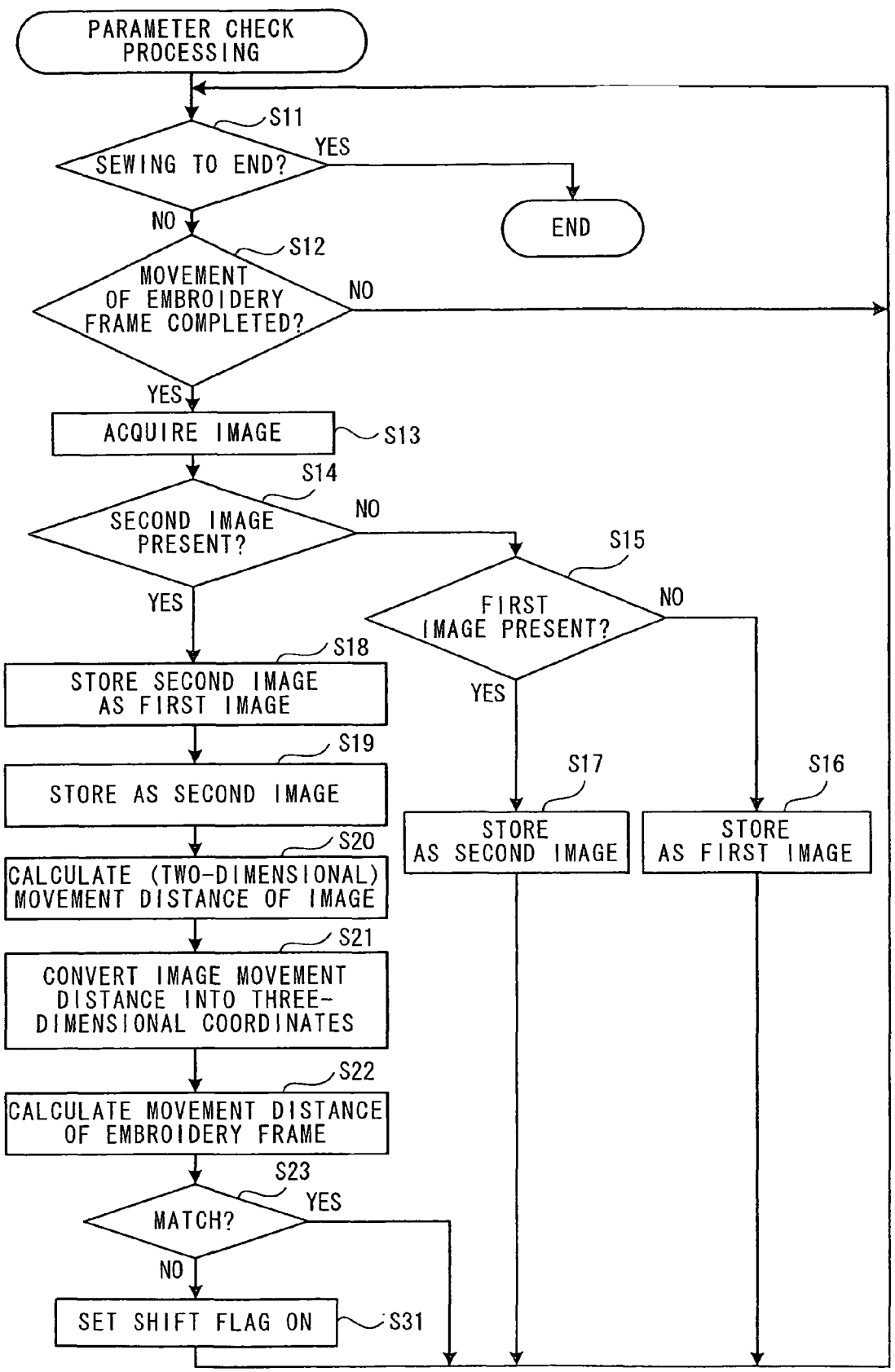
FIG. 17 is a flowchart of a modification of parameter check processing.
Figure 18:
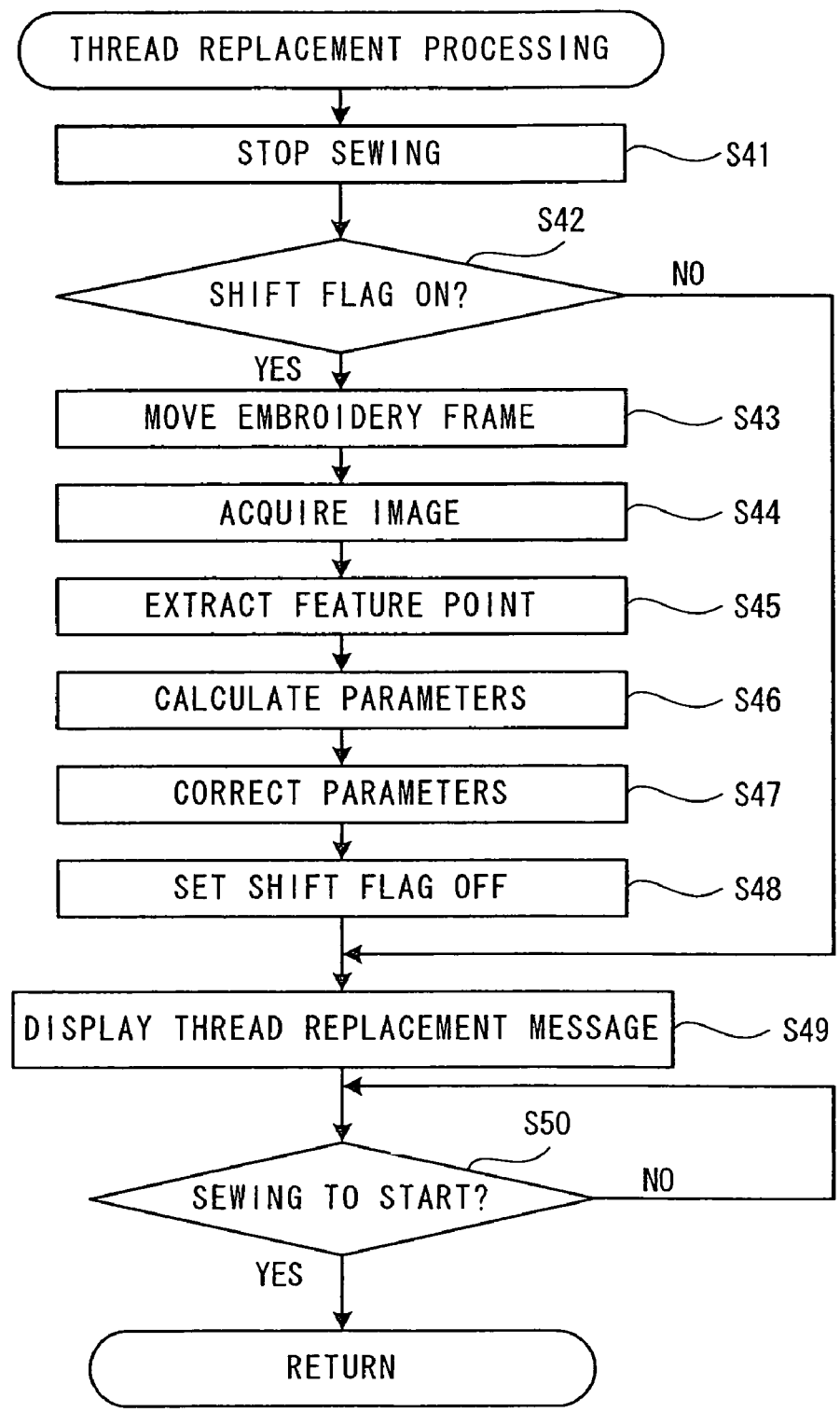
FIG. 18 is a flowchart of thread replacement processing which is carried out when correcting parameters at the time of changing thread colors.

The same step numbers are given to the same steps of the flowchart shown in FIG. 17 as those of the flowchart shown in FIG. 16. In other words, the steps assigned a step number different from that of FIG. 16 are specific to the modification. In the flowchart shown in FIG. 17, S31 is a different step from FIG. 16. In the flowchart shown in FIG. 19, the steps for the same processing as that shown in FIG. 18 are assigned the same step number as that of FIG. 18. In the flowchart shown in FIG. 19, S5 is a different step from FIG. 17.

As shown in FIG. 17, to correct the parameters automatically, a shift flag is used. In parameter check processing, if movement information and schedule information do not match (NO at S23), the shift flag is set ON (S31). A shift flag storage area is arranged in the RAM 63, in which area, for example, "1" indicates the ON state and "0" indicates the OFF state of the flag.

Now, a case will be described below in which embroidery data contains an instruction to replace a thread (thread spool), with reference to the flowchart of FIG. 18. The sewing machine 1 will sew a piece of embroidery based on embroidery data in sewing processing not shown. If this embroidery data contains an thread replacement instruction, the thread replacement processing will be invoked and performed based on this instruction. In this thread replacement processing, as shown in FIG. 18, first, the drive circuit 72 is instructed to stop rotation of the sewing machine motor 79, thus stopping sewing (S41). Next, the process determines whether the shift flag is ON (S42). If the shift flag is ON, the parameters need to be corrected. If the shift flag is not ON (NO at S42), the parameters need not be corrected, so that the process goes to S49, to indicate a thread-replacement instructing message on the LCD 10 (S49). Then, the process waits for a sewing-start instruction (NO at S50, S50). If the sewing start-and-stop switch 41 is pressed by the user to instruct to start sewing (YES at S50), the thread replacement processing ends and the process returns to the sewing processing.

If the shift flag is ON (YES at S42), the parameters need to be corrected. Therefore, to re-calculate the parameters, the embroidery frame 32 is moved to a predetermined position at which an image is to be picked up by the image sensor 50 (S43). Then, an image of the embroidery frame 32 is picked up by the image sensor 50, to provide an image to be used in calculation of the parameters (S44). Subsequently, feature points are extracted from the picked-up image and the coordinates of the feature points are stored in the two-dimensional feature point coordinates storage area 632 of the RAM 63 (S45). The parameters are calculated based on a combination of the two-dimensional coordinates of the feature points (see FIG. 6) and the three-dimensional coordinates of the feature points stored in the three-dimensional feature point coordinates storage area 641 of the EEPROM 64 (see GIH. 7) (S46). The parameters are calculated by a known method for calculating camera calibration parameters. The parameters calculated at S46 are stored in the internal parameter storage area 642 of the EEPROM 64 and the external parameter storage area 643 and corrected (S47). Then, the flag is set OFF (S48). Then, a thread-replacement instructing message appears on the LCD 10 (S49). Then, the process waits for a sewing-start instruction (NO at S50, S50). If the sewing start-and-stop switch 41 is pressed by the user to instruct to start sewing (YES at S50), the thread replacement processing ends and the process returns to the sewing processing.

Figure 19:
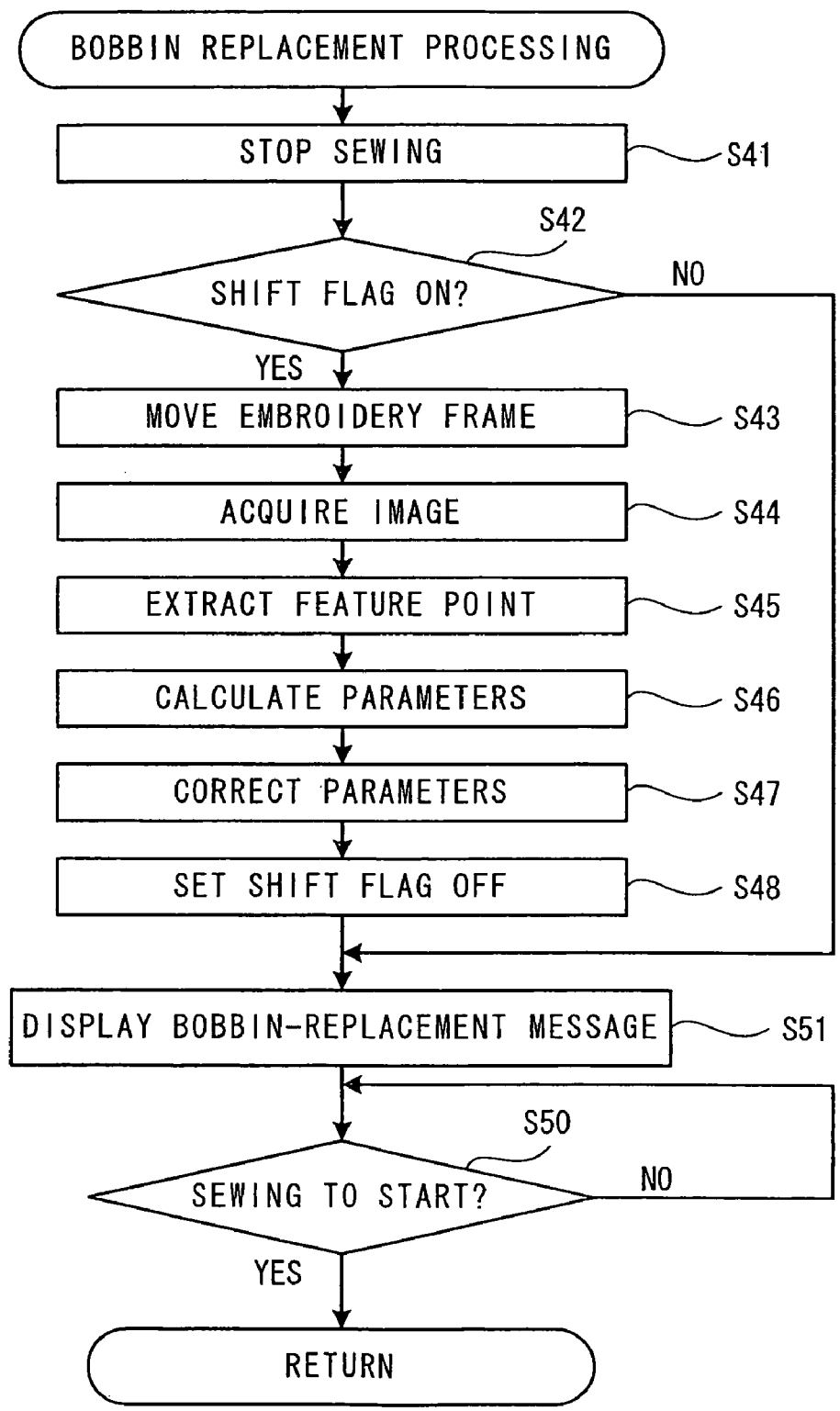
FIG. 19 is a flowchart of bobbin replacement processing which is carried out when correcting the parameters at the time of replacing a bobbin.

Next, a case will be described below in which the need has arisen to replace a bobbin, with reference to a flowchart of FIG. 19. If the sewing machine 1 has run out of a bobbin thread during embroidery sewing based on embroidery data in the sewing processing (not shown), the need to replace the bobbin arises to call and perform bobbin replacement processing. As in the case of the thread replacement processing above, in the bobbin replacement processing, if the shift flag is ON (YES at S42), the parameters are corrected (S43 to S47). Then, the shift flag is set OFF (S48). Then, a bobbin-replacement instructing message is displayed on the LCD 10 (S51). Then, the process waits for a sewing-start instruction (NO at S50, S50). If the sewing start-and-stop switch 41 is pressed by the user to instruct to start sewing (YES at S50), the thread replacement processing ends and the process returns to the sewing processing.

It should be noted that a determination as to whether the shift flag is ON for determining whether the parameters need to be corrected may not only made at the time of the thread replacement or bobbin replacement processing but also made when starting sewing or when sewing has been ended. In other words, when starting sewing or when sewing has ended, the processing from S42 to S47 shown in FIG. 19 may be performed. In such a manner, the sewing machine 1 itself can detect a shift in position of the image sensor 50 to correct the parameters and, therefore, can acquire accurate position information (coordinates) from an image picked up by the image sensor 50. Accordingly, the sewing machine 1 can properly carry out processing (for example, processing of an image, acquisition of coordinates of a needle drop point, and measurement of a stitch length) that uses the position information acquired from the images.

As described above, in the sewing machine 1, during sewing, it is possible to determine whether the parameters need to be re-calculated and corrected, based on whether movement information and schedule information match. If they do not match and it is necessary to re-calculate and correct the parameters, the user can be notified of it. Accordingly, even if the setup position of the image sensor 50 has shifted due to the vibrations caused by sewing operations of the sewing machine 1 or the user's touch on the image sensor 50, it is possible to prevent the user from continuously using the image sensor 50 without knowing that the parameters currently being used are not appropriate. It is further possible to prompt the user to correct the parameters. Therefore, by correcting the parameters, the user can acquire accurate position information from an image picked up by the image sensor 50. It is then possible to properly perform the processing that uses the position information acquired from the image.

If the movement information and the schedule information do not match and it is necessary to re-calculate the parameters, the sewing machine 1 can automatically re-calculate the parameters and correct them without notifying the user of it. Accordingly, even if the setup position of the image sensor 50 has shifted due to the vibrations caused by sewing operations of the sewing machine 1 or the user's touch on the image sensor 50, the sewing machine itself can re-calculate the parameters that are suitable for the current setup position of the image sensor 50. It is thus possible to acquire accurate position information from an image picked up by the image sensor 50.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:
1. A sewing machine comprising:
  an image pickup device that is disposed at a position where an image can be picked up over a sewing machine bed;
  a feature point coordinates calculation device that extracts a plurality of feature points arranged over a range such that the image pickup device can pick up images therein from the image picked up by the image pickup device and that calculates two-dimensional coordinates of the extracted feature points as feature point coordinates;

a reference coordinates storage device that stores reference coordinates, which are previously measured three-dimensional coordinates of the feature points;

a correlation device that correlates the reference coordinates stored in the reference coordinates storage device with the feature point coordinates calculated by the feature point coordinates calculation device;

a parameter calculation device that calculates a parameter about the image pickup device based on a result of correlation by the correlation device;

a parameter storage device that stores the parameter calculated by the parameter calculation device;

a comparison image acquisition device that acquires the image picked up by the image pickup device as a comparison image;

a first determination device that determines whether comparison information that is based on the comparison image acquired by the comparison image acquisition device matches with parameter information that is based on a basic image that was used to calculate the parameter stored in the parameter storage device; and a first notification device that notifies that it is necessary to re-calculate the parameter if the first determination device has determined that the comparison information and the parameter information do not match with each other, wherein the comparison information and the parameter information which are determined by the first determination device as to whether they match with each other are respectively at least one of:
the comparison image and the basic image;
the feature point coordinates calculated based on the comparison image and the feature point coordinates calculated based on the basic image; and
the parameter calculated based on the comparison image and the parameter stored in the parameter storage device.

2. The sewing machine according to claim 1, wherein:
the feature point is at least one vertex of a square shaped hole and a center of a circular hole formed in a needle plate placed on the sewing machine bed.

3. The sewing machine according to claim 1, wherein:
the feature point is a point on a punch mark provided on a surface of the needle plate.

4. The sewing machine according to claim 1, further comprising:
an embroidery apparatus that moves an embroidery frame which holds work cloth in a condition where the embroidery frame is placed on the sewing machine bed,
wherein the feature point is at least one of:
a point on the punch mark provided on the embroidery frame and
a point on the punch mark provided on a template placed on the embroidery frame.

5. The sewing machine according to claim 1, further comprising:
an embroidery apparatus that moves an embroidery frame which holds work cloth in a condition where the embroidery frame is placed on the sewing machine bed, wherein:
at least one point is provided at least on the embroidery frame and on a template placed on the embroidery frame;
the reference coordinates storage device defines the point, as the feature point, in a condition where the embroidery frame is moved by the embroidery apparatus and disposed to a plurality of predetermined positions on the sewing machine bed and then stores the respective reference coordinates of the feature point at the predetermined positions; and
the feature point coordinates calculation device moves the embroidery frame to a plurality of positions by the embroidery apparatus, picks up an image over the sewing machine bed by the image pickup device, extracts the feature point, and calculates the two-dimensional coordinates of the feature point.

6. The sewing machine according to claim 1, further comprising:
an image processing device that processes an image picked up by the image pickup device, in accordance with the parameter stored in the parameter storage device.

7. The sewing machine according to claim 1, further comprising:
a three-dimensional coordinates calculation device that calculates the three-dimensional coordinates of a point in an image picked up by the image pickup device, in accordance with the parameter stored in the parameter storage device.

8. The sewing machine according to claim 1, further comprising:
a two-dimensional coordinates calculation device that calculates the coordinates of a point in the two-dimensional coordinate system which the coordinates of a predetermined point represented in the three-dimensional coordinates are projected onto, in accordance with the parameter stored in the parameter storage device.

9. The sewing machine according to claim 1, wherein the image pickup device is a CMOS image sensor.

10. A sewing machine comprising:
an image pickup device that is disposed at a position where an image can be picked up over a sewing machine bed;
a feature point coordinates calculation device that extracts a plurality of feature points arranged over a range such that the image pickup device can pick up images therein from the image picked up by the image pickup device and that calculates two-dimensional coordinates of the extracted feature points as feature point coordinates;
a reference coordinates storage device that stores reference coordinates, which are previously measured three-dimensional coordinates of the feature points;
a correlation device that correlates the reference coordinates stored in the reference coordinates storage device with the feature point coordinates calculated by the feature point coordinates calculation device;
a parameter calculation device that calculates a parameter about the image pickup device based on a result of correlation by the correlation device;
a parameter storage device that stores the parameter calculated by the parameter calculation device;
a comparison image acquisition device that acquires the image picked up by the image pickup device as a comparison image;
a first determination device that determines whether comparison information that is based on the comparison image acquired by the comparison image acquisition device matches with parameter information that is based on a basic image that was used to calculate the parameter stored in the parameter storage device;
a parameter re-calculation device that calculates the feature point coordinates with respect to the comparison image by the feature point coordinates calculation device, correlates the feature point coordinates calculated by the correlation device with the reference coordinates, and calculates the parameter based on a result of correlation by the parameter calculation device; and a first parameter correction device that stores the parameter calculated by the parameter re-calculation device into the parameter storage device if the first determination device has determined that the comparison information and the parameter information do not match with each other, wherein the comparison information and the parameter information which are determined by the first determination device as to whether they match with each other are respectively at least one of:
the comparison image and the basic image;
the feature point coordinates calculated based on the comparison image and the feature point coordinates calculated based on the basic image; and
the parameter calculated based on the comparison image and the parameter stored in the parameter storage device.

11. A sewing machine comprising:
an embroidery apparatus that moves an embroidery frame which holds work cloth;
an image pickup device that is disposed at a position where an image can be picked up over a sewing machine bed;
a feature point coordinates calculation device that extracts a plurality of feature points arranged over a range such that the image pickup device can pick up images therein from the image picked up by the image pickup device and that calculates two-dimensional coordinates of the extracted feature points as feature point coordinates;
a reference coordinates storage device that stores reference coordinates, which are previously measured three-dimensional coordinates of the feature points;
a correlation device that correlates the reference coordinates stored in the reference coordinates storage device with the feature point coordinates calculated by the feature point coordinates calculation device;
a parameter calculation device that calculates a parameter about the image pickup device based on a result of correlation by the correlation device;
a parameter storage device that stores the parameter calculated by the parameter calculation device;
an embroidery data acquisition device that acquires embroidery data which indicates at least coordinates of a stitch in order to sew a piece of embroidery;
a schedule information calculation device that calculates schedule information about predetermined movement at the time when the embroidery frame is moved, based on the embroidery data acquired by the embroidery data acquisition device;
a movement information acquisition device that picks up the image of the embroidery frame disposed on the sewing machine bed by the image pickup device before and after the predetermined movement on which the schedule information has been calculated by the schedule information calculation device when the embroidery frame was moved based on the embroidery data acquired by the embroidery data acquisition device, and acquires movement information about movement of at least one of the embroidery frame, the work cloth, and the stitch formed in the work cloth from the picked up image;
a first determination device that determines whether the movement information acquired by the movement information acquisition device matches with the schedule information calculated by the schedule information calculation device; and a first notification device that notifies that it is necessary to re-calculate the parameter if the first determination device has determined that the movement information and the schedule information do not match with each other.

12. A sewing machine comprising:
an embroidery apparatus that moves an embroidery frame which holds work cloth;
an image pickup device that is disposed at a position where an image can be picked up over a sewing machine bed;
a feature point coordinates calculation device that extracts a plurality of feature points arranged over a range such that the image pickup device can pick up images therein from the image picked up by the image pickup device and calculates two-dimensional coordinates of the extracted feature points as feature point coordinates;
a reference coordinates storage device that stores reference coordinates, which are previously measured three-dimensional coordinates of the feature points;
a correlation device that correlates the reference coordinates stored in the reference coordinates storage device with the feature point coordinates calculated by the feature point coordinates calculation device;
a parameter calculation device that calculates a parameter about the image pickup device based on a result of correlation by the correlation device;
a parameter storage device that stores the parameter calculated by the parameter calculation device;
an embroidery data acquisition device that acquires embroidery data which indicates at least coordinates of a stitch in order to sew a piece of embroidery;
a schedule information calculation device that calculates schedule information about predetermined movement at the time when the embroidery frame is moved, based on the embroidery data acquired by the embroidery data acquisition device;
a movement information acquisition device that picks up the image of the embroidery frame disposed on the sewing machine bed by the image pickup device before and after the predetermined movement on which the schedule information has been calculated by the schedule information calculation device when the embroidery frame was moved based on the embroidery data acquired by the embroidery data acquisition device, and acquires movement information about movement of at least one of the embroidery frame, the work cloth, and the stitch formed in the work cloth from the picked up image;
a first determination device that determines whether the movement information acquired by the movement information acquisition device matches with the schedule information calculated by the schedule information calculation device; and
a first parameter correction device that:
if the first determination device has determined that the movement information and the schedule information do not match with each other,
picks up the image by the image pickup device;
calculates the feature point coordinates by the feature point coordinates calculation device to correlate the feature point coordinates with the reference coordinates by the correlation device;
calculates the parameter by the parameter calculation device;
and stores the parameter calculated by the parameter calculation device into the parameter storage device.

13. A non-transitory computer-readable storage medium storing a control program executable on a sewing machine, the program comprising:
- picking up an image over a predetermined range of a sewing machine bed;
- extracting a plurality of feature points arranged in the predetermined range from the image picked up and calculating two-dimensional coordinates of the extracted feature points as feature point coordinates;
- storing reference coordinates, which are previously measured three-dimensional coordinates of the feature points;
- correlating the reference coordinates stored with the feature point coordinates calculated;
- calculating a parameter about the image pickup based on a result of correlation;
- storing the parameter calculated;
- acquiring the image picked up as a comparison image;
- determining whether comparison information that is based on the comparison image acquired matches with parameter information that is based on a basic image that was used to calculate the parameter stored; and
- notifying that it is necessary to re-calculate the parameter if it is determined that the comparison information and the parameter information do not match with each other,
- wherein the comparison information and the parameter information which are determined as to whether they match with each other are respectively at least one of:
  - the comparison image and the basic image;
  - the feature point coordinates calculated based on the comparison image and the feature point coordinates calculated based on the basic image; and
  - the parameter calculated based on the comparison image and the parameter stored.

14. The storage medium according to claim 13, wherein:
- the feature point is set to at least one point which is placed on at least one of the embroidery frame of the sewing machine in a condition where the embroidery frame is disposed at a predetermined position on the sewing machine bed and a template placed on the embroidery frame;
- storing reference coordinates, the reference coordinates of the feature point are stored at each of a plurality of predetermined positions on the sewing machine bed disposed by permitting the embroidery frame to move; and
- extracting a plurality of feature points, the embroidery frame is moved to the plurality of predetermined positions, an image is picked up over the sewing machine bed, the feature point is extracted, and the two-dimensional coordinates of the feature point are calculated.

15. The storage medium according to claim 13, further comprising:
- processing an image picked up, in accordance with the parameter stored.

16. The storage medium according to claim 13, further comprising:
- calculating the three-dimensional coordinates of a point in an image picked up, in accordance with the parameter stored.

17. The storage medium according to claim 13, further comprising:
- calculating the coordinates of a point in the two-dimensional coordinate system, in which the coordinates of a predetermined point represented in the three-dimensional coordinates are projected onto, in accordance with the parameter stored.

18. A non-transitory computer-readable storage medium storing a control program executable on a sewing machine, the program comprising:
- picking up an image over a predetermined range of a sewing machine bed;
- extracting a plurality of feature points arranged in the predetermined range from the image picked up and calculating two-dimensional coordinates of the extracted feature points as feature point coordinates;
- storing reference coordinates, which are previously measured three-dimensional coordinates of the feature points;
- correlating the reference coordinates stored with the feature point coordinates calculated;
- calculating a parameter about the image pickup based on a result of correlation;
- storing the parameter calculated;
- acquiring the image picked up as a comparison image;
- determining whether comparison information that is based on the comparison image acquired matches with parameter information that is based on a basic image that was used to calculate the parameter stored;
- calculating the feature point coordinates with respect to the comparison image, correlating the feature point coordinates calculated with the reference coordinates, and calculating the parameter based on a result of correlation; and
- storing the parameter calculated if it is determined that the comparison information and the parameter information do not match with each other,
- wherein the comparison information and the parameter information which are determined as to whether they match with each other are respectively at least one of:
  - the comparison image and the basic image;
  - the feature point coordinates calculated based on the comparison image and the feature point coordinates calculated based on the basic image; and
  - the parameter calculated based on the comparison image and the parameter stored.

19. A non-transitory computer-readable storage medium storing a control program executable on a sewing machine, the program comprising:
- picking up an image over a predetermined range of a sewing machine bed;
- extracting a plurality of feature points arranged in the predetermined range from the image picked up and calculating two-dimensional coordinates of the extracted feature points as feature point coordinates;
- storing reference coordinates, which are previously measured three-dimensional coordinates of the feature points;
- correlating the reference coordinates stored with the feature point coordinates calculated;
- calculating a parameter about the image pickup based on a result of correlation;
- storing the parameter calculated;
- acquiring embroidery data which indicates at least coordinates of a stitch in order to sew a piece of embroidery;
- calculating schedule information about predetermined movement at the time when an embroidery frame of the sewing machine is moved, based on the embroidery data acquired;
- picking up the image of the embroidery frame disposed on the sewing machine bed before and after the predetermined movement on which the schedule information has been calculated when the embroidery frame was moved based on the embroidery data acquired, and acquiring movement information about movement of at least one of the embroidery frame, the work cloth, and the stitch formed in the work cloth from the picked up image;

determining whether the movement information acquired matches with the schedule information calculated; and notifying that it is necessary to re-calculate the parameter if it is determined that the movement information and the schedule information do not match with each other.

20. A non-transitory computer-readable storage medium storing a control program executable on a sewing machine, the program comprising:

picking up an image over a predetermined range of a sewing machine bed;

extracting a plurality of feature points arranged in the predetermined range from the image picked up and calculating two-dimensional coordinates of the extracted feature points as feature point coordinates;

storing reference coordinates, which are previously measured three-dimensional coordinates of the feature points;

correlating the reference coordinates stored with the feature point coordinates calculated;

calculating a parameter about the image pickup based on a result of correlation;

storing the parameter calculated;

acquiring embroidery data which indicates at least coordinates of a stitch in order to sew a piece of embroidery;

calculating schedule information about predetermined movement at the time when an embroidery frame of the sewing machine is moved, based on the embroidery data acquired;

picking up the image of the embroidery frame disposed on the sewing machine bed before and after the predetermined movement on which the schedule information has been calculated when the embroidery frame was moved based on the embroidery data acquired, and acquiring movement information about movement of at least one of the embroidery frame, the work cloth, and the stitch formed in the work cloth from the picked up image;

determining whether the movement information acquired matches with the schedule information calculated; and correcting the parameter if it is determined that the movement information and the schedule information do not match with each other, picking up the image, calculating the feature point coordinates to correlate the feature point coordinates with the reference coordinates, calculating the parameter, and storing the parameter calculated.

\* \* \* \* \*